United States Patent
Takada

(10) Patent No.: US 8,280,037 B2
(45) Date of Patent: Oct. 2, 2012

(54) ECHO CANCELLER HAVING ITS EFFECTIVE FILTER TAPS ADAPTIVELY CONTROLLED WITH ECHO CANCELLATION AMOUNT MONITORED

(75) Inventor: Masashi Takada, Yokohama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 252 days.

(21) Appl. No.: 12/877,990

(22) Filed: Sep. 8, 2010

(65) Prior Publication Data
US 2011/0058667 A1    Mar. 10, 2011

(30) Foreign Application Priority Data
Sep. 9, 2009  (JP) .................................. 2009-208337

(51) Int. Cl.
*H04M 9/08* (2006.01)
(52) U.S. Cl. .............................. 379/406.08; 379/406.03
(58) Field of Classification Search ............. 379/406.08, 379/406.03, 406.01, 406.06
See application file for complete search history.

(56) References Cited

U.S. PATENT DOCUMENTS

| | | | | |
|---|---|---|---|---|
| 5,796,725 A * | 8/1998 | Muraoka | ........................ | 370/290 |
| 2004/0037417 A1* | 2/2004 | Seibert | ...................... | 379/406.01 |
| 2007/0058798 A1* | 3/2007 | Takada | ...................... | 379/406.01 |
| 2009/0074177 A1* | 3/2009 | Takada | ...................... | 379/406.01 |
| 2009/0129584 A1* | 5/2009 | Aoyagi et al. | ........... | 379/406.06 |
| 2009/0304178 A1* | 12/2009 | Takada | ...................... | 379/406.08 |

FOREIGN PATENT DOCUMENTS

| | | |
|---|---|---|
| JP | 08-251079 A | 9/1996 |
| JP | 09-055687 A | 2/1997 |
| JP | 2006-157498 A | 6/2006 |

\* cited by examiner

*Primary Examiner* — Olisa Anwah
(74) *Attorney, Agent, or Firm* — Rabin & Berdo, P.C.

(57) ABSTRACT

In an echo canceller including an ADF and a cancellation adder, an ACANC calculator finds an average value of the amount of echo cancellation for a predetermined period to update the average value of the amount of echo cancellation, and detects a convergence state of the ADF to find the amount of echo cancellation in the convergence state of the ADF. A coefficient selector, when receiving a detection signal of the convergence state from the ACANC calculator, finds a power ratio of the sum total of power of all tap coefficients and the partial total of power of tap coefficients not to be assigned to taps to determine the effective number of taps useful for suppressing an echo component on the basis of the amount of echo cancellation and the power ratio. The ADF updates only the effective number of taps to disable the remaining taps.

20 Claims, 11 Drawing Sheets

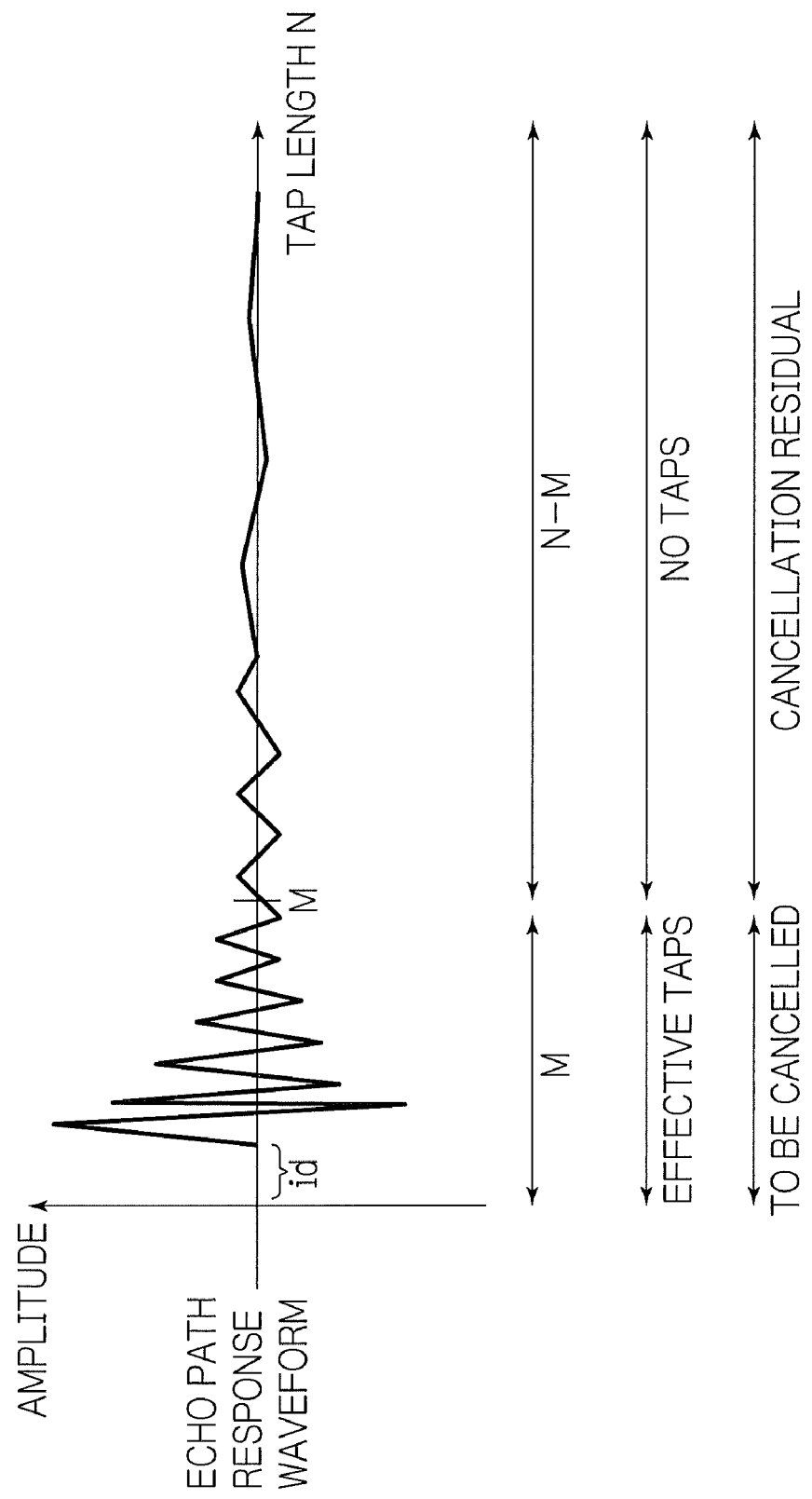

ECHO CANCELLER HAVING ITS EFFECTIVE FILTER TAPS ADAPTIVELY CONTROLLED WITH ECHO CANCELLATION AMOUNT MONITORED

BACKGROUND OF THE INVENTION

1. Field of the Invention

The present invention relates to an echo canceller, and more particularly to an echo canceller for use in, for example, a telephone terminal unit such as an audio teleconference terminal and a hands-free telephone set.

2. Description of the Background Art

Conventionally, a type of echo canceller is disclosed in Japanese Patent Laid-Open Publication No. 251079/1996. The Japanese Publication discloses a solution to an echo canceller mainly for use in a telephone switching system. More in detail, in the solution disclosed, when a hybrid circuit having an echo source impulse response characteristic is remotely located, the echo canceller estimates a delay up to the hybrid circuit, i.e. an initial delay on the echo path, from a signal output specific for measurement and a response signal thereto to assign a pure delay instead of filter coefficients of its adaptive filter and assign a predetermined length of taps residually held subsequent to the pure delay, thereby virtually shortening the tap length of the adaptive filter.

That solution relies upon the known fact that the longer tap length of an adaptive filter the longer period of its convergence time. That solution utilizes the fact that ones, assigned to the initial delay part of an echo path, of the taps of an adaptive filter do not substantially contribute to removing an echo.

However, if the solution disclosed in the Japanese '079 Publication is directly applied to an acoustic echo canceller, the acoustic echo would behave totally differently in echo path from the network echo so that the positional assignment of tap coefficients of an adaptive filter would still remain insufficient or excessive. This problem of the acoustic echo path is attributable to the fact that not only an initial delay but also an echo response after the initial delay, i.e. a scattering time response, would be extensively different from one to another. Therefore, the echo responses are different in length of trailing part.

From a different viewpoint, this problem is a natural and unavoidable phenomenon. The echo path of a network echo involves a response of a hybrid electric circuit that may be uniformly manufactured to a certain extent such as to satisfy the requirements of standardized telephone lines. In contrast, the acoustic echo path is a sound path on which part of a sound emitted from a loudspeaker is transmitted to be captured by a microphone. In other words, the acoustic echo is a response of sound reflection in a room including reflection caused with the presence of a near-end talker. It is therefore only natural such a response varies widely.

However, the solution disclosed in the Japanese '079 Publication has to have filters prepared in advance which have the respective filter lengths corresponding to the maximum length of echo paths possibly expected in practice in order to overcome the problem stated above. In a case where the initial delay and scatter response of an actual acoustic echo path are not very large, all of the residual long taps are assigned immediately thereafter. As a result, unnecessary filter coefficient taps would not be reduced. Thus, the period of convergence time is still long.

A further unfavorable problem is that, when an adaptive filter drives more taps than actually needed, such unnecessary taps may cause an error in echo estimation. Rather, the solution disclosed in the Japanese '079 Publication may often deteriorate the performance in removing the echo.

Moreover, even for the parts and calculations of an echo canceller causing such an error, filtering and coefficient updating are performed in exactly the same way as the parts and calculations originally necessary. This causes a digital signal processor (DSP) to perform unnecessary calculation and processing and consume excessive electric power therefor.

In order to overcome those underlying difficulties, U.S. Pat. No. 5,796,725 to Muraoka and Japanese Patent Laid-Open Publication No. 55687/1997 present solutions for controlling not only the initial delay but also shortening the tap length of an adaptive filter assigned to the scatter response part of an echo path.

In Muraoka, the degree of convergence of an adaptive filter is determined by the magnitude of a cancellation error, and, if the cancellation error is determined small, then a filter coefficient is reset which is smaller in value among the taps of the adaptive filter. Muraoka thus discloses a solution by applying no reset coefficient part to the adaptive filter, thereby reducing the number of taps.

The Japanese '687 Publication discloses an adaptive filter (ADF) having its tap coefficients grouped into several blocks, in which an initial delay is estimated in the initial operation, and thereafter it is determined on a block-by-block basis, while enabling the convergence to progress, whether or not the power of the tap coefficients exceeds a predetermined threshold value. A part exceeding the threshold value is used as a basic region for updating the ADF coefficient. Thereafter, while monitoring a residual signal increasing and decreasing, basically it is determined whether or not the deletion of the trailing block renders an echo return loss enhancement (ERLE) deteriorated and, if deteriorated, then the deleted block is restored. That procedure is repeated, thereby generally optimizing the taps However, even these solutions often cause disadvantages. When applying the solution of Muraoka, a coefficient smaller in value than a predetermined threshold value is simply deleted. As a result, the taps are reduced in number, indeed. However, it may sometimes occur that the taps may be deleted so as to be thinned out, or even a correct tap coefficient incidentally small in value but appropriate for an input component may be removed, thereby deteriorating the performance. Moreover, when a residual is small, a part having a small coefficient is automatically deleted. However, in the case of a signal such as a voice signal fluctuable in reference input level, it is a natural phenomenon that a small residual signal simply involves the reference input level and an echo responsive thereto being small. Application of the solution of Muraoka causes such a natural phenomenon to be affected by a coefficient deletion, so that even a necessary coefficient is rendered deleted. Therefore, this solution involves such a problem that a sufficient echo cancellation may gradually become failed.

When applying the solution taught by the Japanese '687 Publication, in order to design the length of the blocks of ADF tap coefficients most appropriate for the size of a room or the like, an extensive proficiency is required, thus rendering it difficult to flexibly determine/design the bock length appropriate for an object to be applied to. Furthermore, a repetitive trial of increasing and decreasing the number of taps on a block-by-block basis results in the performance of echo removal being repeatedly deteriorated so as to cause the speech quality to be deteriorated, which is also problematic.

Against these difficulties, Japanese Patent Laid-Open Publication No. 2006-157498 discloses an excellent echo cancel solution in which the initial delay is calculated from the maximum value of coefficients of an adaptive filter to assign a delay in an initial delay part so as to save the tap length of a part corresponding to the initial delay of the adaptive filter, and further the adaptive filter has its taps grouped into blocks of different lengths, on each of which the sum-of-products value of the normalized power of the coefficients is calculated. It is determined in each block whether or not the normalized power becomes smaller as the more backward taps following the tap corresponding to the delay to thereby determine the adaptive filter converging. A predetermined threshold value is provided, and if the ratio in power of the rear blocks to the front blocks is smaller than the threshold value, the blocks are reduced whereas if the ratio is larger than the threshold value the blocks are increased, thus decreasing or increasing the tap coefficients on the block-by-block basis, with the result that the tap length of a scattering time section is also saved.

However, the solution of the Japanese '498 Publication also has a problem as described below. For example, when noise at the near-end talker is large so that a difference in power between the echo and the noise is small, a difference in power between the tap coefficients is also not significantly large. That may cause the blocks to be gradually increased toward the maximum length.

When the echo cannot be removed due to a noise in this way, it is preferable to reduce the tap length as short as possible to thereby save the resource of calculation and power consumption for the calculation.

However, when a difference in power between the noise and the echo is large and the boundary of the blocks coincides with the substantial part of the echo path, one block is reduced to cause an abrupt lack of the taps, and in turn the tap length is increased to update the coefficients in order to compensate for the lacking taps. The operation will be repeated. Thus, similar to the Japanese '687 Publication, a repetitive deterioration in performance of echo reduction may occur, which is problematic.

SUMMARY OF THE INVENTION

It is therefore an object of the present invention to provide an echo canceller substantially free from deterioration in performance of echo suppression.

It is a more specific object of the present invention to provide an echo canceller in which calculation volume and power consumption for calculation are reduced and which is operative with a short tap length and promptly responsive to a change in condition without deteriorating its echo suppression performance.

In accordance with the present invention, an echo canceller including an adaptive filter (ADF) for utilizing a far-end input signal to generate a pseudo-echo signal, and an echo suppression circuit for using the pseudo-echo signal to suppress an echo component included in a near-end input signal includes: an ACANC (Amounts of echo CANCellation) calculator operative in response to the near-end input signal inputted to the echo suppression circuit and an output signal outputted from the echo suppression circuit for finding an average value of the amount of echo cancellation for a predetermined period to update the average value of the amount of echo cancellation accordingly, and detecting a convergence state of the ADF to finding the amount of echo cancellation for a convergence period in the convergence state of the ADF; and a coefficient selector operative in response to a detection signal of the convergence state of the ADF being received from the ACANC calculator for finding a power ratio of the sum total of power of all tap coefficients held by the ADF and a partial total of power of tap coefficients not to be assigned to taps among the tap coefficients of the ADF, and determining the effective number of taps useful for suppressing an echo component on the basis of the amount of echo cancellation for the convergence period and the power ratio, the ADF updating the effective number of taps determined by the coefficient selector.

In accordance with an aspect of the invention, an echo canceller including an ADF for utilizing a far-end input signal to generate a pseudo-echo signal, and an echo echo suppression circuit for using the pseudo-echo signal to suppress an echo component included in a near-end input signal includes: an ACANC calculator operative in response to the near-end input signal inputted to the echo suppression circuit and an output signal outputted from the echo suppression circuit for finding an average value of the amount of echo cancellation for a predetermined period to update the average value of the amount of echo cancellation accordingly, and detecting a convergence state of the ADF to find the amount of echo cancellation for a convergence period in the convergence state of the ADF; a coefficient selector operative in response to a detection signal of the convergence state of the ADF being received from the ACANC calculator for finding a power ratio of the sum total of power of all tap coefficients held by the ADF and a partial total of power of tap coefficients not to be assigned to taps among the tap coefficients of the ADF, and determining the effective number of taps useful for suppressing an echo component on the basis of the amount of echo cancellation for the convergence period and the power ratio; and a voice activity detector (VAD) for detecting whether or not a voice signal is inputted on a receiver path; an echo loss calculator for finding the attenuation amount of sound over the echo path on the basis of the magnitudes of the far-end input signal and the near-end input signal during the period of the detection of voice activity by the VAD, and comparing the attenuation amount with a predetermined loss threshold value to producing a stop signal for stopping operation of the echo canceller; an echo/noise ratio calculator for using a result of detection of the voice activity by the VAD to find, from the magnitudes of an echo component included in the near-end input signal and noise included in the near-end input signal, a ratio or a difference in magnitude between the echo component and the noise, and comparing the found ratio or difference with a threshold value; an effectivity determination circuit for determining whether to enable the operation of the echo canceller on the basis of a comparison result from the echo/noise ratio calculator; and a power saving priority determination circuit responsive to the attenuation amount found by the echo loss calculator exceeding a threshold value and the effectivity determination circuit determining the operation of the echo canceller to stop for stopping the operation of the echo canceller and passing the near-end input signal.

In accordance with the present invention, an amount-of-echo cancellation calculator calculates an amount of echo cancellation ACANC of an echo canceller, and a coefficient selector monitors the relationship in characteristics between ACANC and a coefficient value of an adaptive filter coefficient, and calculates some of tap coefficients effectively acting for an actual echo suppression so as to select only this part to enable this part to function as an ADF and to stop the remaining tap coefficients from operating. Thus, without deteriorating the performance for suppressing echo, the number of taps can be reduced to decrease a computation volume and power for computation, which can therefore quickly respond even to a change in condition.

BRIEF DESCRIPTION OF THE DRAWINGS

The objects and features of the present invention will become more apparent from consideration of the following detailed description taken in conjunction with the accompanying drawings in which:

FIG. 3A is a graph plotting a response waveform on an echo path with respect to the tap length in the echo canceller shown in FIG. 1 in order to describe the relationship between the amount of echo cancellation and a cancellation residual;

DESCRIPTION OF THE PREFERRED EMBODIMENTS

Figure 1:
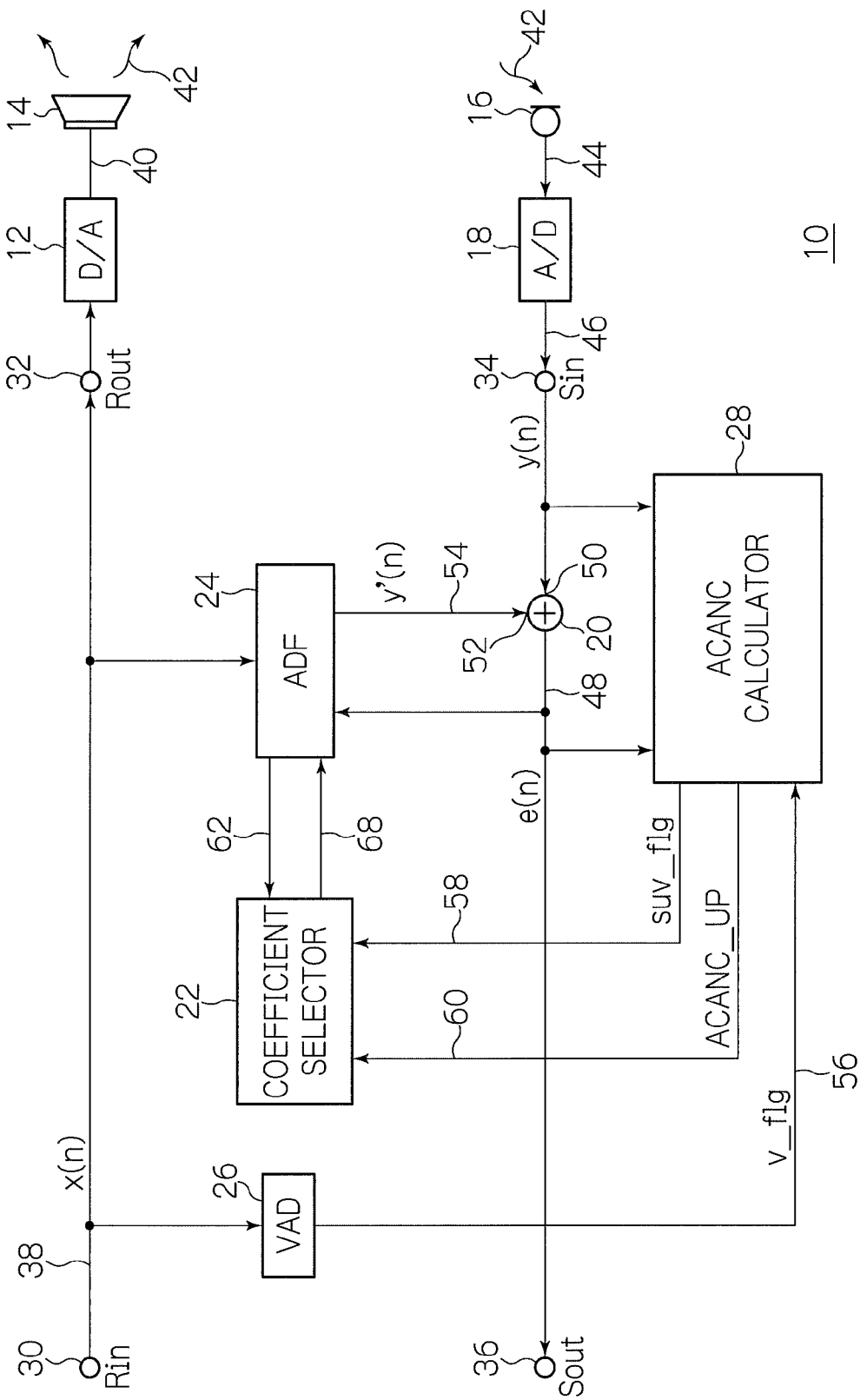
FIG. 1 is a schematic block diagram showing the configuration of a preferred embodiment of an echo canceller to which the present invention is applied.

Well, reference will be made to the accompanying drawings to describe in detail an echo canceller in accordance with preferred embodiments of the present invention. With reference to FIG. 1, an echo canceller 10 in accordance with a preferred embodiment includes an adaptive filter (ADF) 24 adapted for using a far-end input signal to generate a pseudo-echo signal, and a cancellation adder 20 adapted for using the pseudo-echo signal to suppress an echo component included in a near-end input signal. The echo canceller 10 includes an ACANC (Amounts of echo CANCellation calculator) 28 adapted to be responsive to the near-end input signal 46 inputted to the cancellation adder 20 and an output signal 48 outputted from the cancellation adder 20 to find an average value of the amount of echo cancellation for a predetermined period to update the average value of the amount of echo cancellation concurrently, or on a real-time basis, to detect the convergence state of the ADF 24, and to find the amount of echo cancellation for a convergence period in the convergence state of the ADF 24. The echo canceller 10 further includes a coefficient selector 22 adapted to be responsive to a detection signal of the convergence state of the ADF 24 received from the ACANC calculator 28 to find a power ratio of the sum total of power of all tap coefficients held by the ADF 24 to a partial total of power of ones, to be excluded from tap assignment, of the tap coefficients of the ADF 24, and to determine the effective number of taps useful for suppressing an echo component on the basis of the amount of echo cancellation for the convergence period and the power ratio. The ADF 24 is adapted to update only the effective number of taps determined by the coefficient selector 22 to stop the other taps. Thus, without deteriorating performance for suppressing an echo, the number of taps can be reduced so as to decrease calculation volume and power consumption for calculation, which can therefore quickly be adaptive to a change in condition.

In FIG. 1, the echo canceller 10 in accordance with the instant illustrative embodiment is shown with its left and right sides directed to far-end and near-end talkers or listeners, not shown, respectively. It is to be noted that talkers could be listeners when appropriate. In the context, therefore, the term "talker" may be understood as a listener when listening to audible sound, such as voice. Elements or portions not directly relevant to understanding the present invention will neither be described nor shown. Signals are designated with reference numerals for connection lines on which they appear. In the following, like components and elements are designated with identical reference numerals and repetitive descriptions thereon will be omitted.

The echo canceller 10 include, as shown in FIG. 1, a digital-to-analog (D/A) converter 12, a loudspeaker 14, a microphone 16, an analog-to-digital (A/D) converter 18 and a VAD (Voice activity detector) 26, in addition to the cancellation adder 20, the coefficient selector 22, the ADF 24 and the ACANC calculator 28, which are interconnected as illustrated. The echo canceller 10 has a receiver input terminal Rin (30), a receiver output terminal Rout (32), a transmitter input terminal Sin (34), and a transmitter output terminal Sout (36).

The receiver input terminal Rin (30) is connected for receiving a far-end input signal or a far-end talker signal x(n) 38 into which an audio signal of a far-end talker is digitized. The receiver output terminal Rout (32) is connected for outputting the far-end input signal x(n) 38 from the far-end talker to the D/A converter 12.

The D/A converter 12 has a function to convert a supplied digital signal to a corresponding analog signal. The D/A converter 12 converts a digital signal 38 outputted from the receiver output terminal Rout (32) to an analog signal 40 to output the converted signal to the loudspeaker 14.

The loudspeaker 14 has a function to receive an audio signal to transduce the latter to a corresponding audible sound. The loudspeaker 14 receives an audio signal 40 supplied from the D/A converter 12, and emits a sound 42 to space.

The microphone 16 has a function to catch a sound to convert the captured sound to a corresponding audio signal in the form of electric signal. The microphone 16 catches the sound 42 on a near-end side to convert the sound 42 to an audio signal 44, and supplies the audio signal 44 to the A/D converter 18.

The A/D converter 18 has a function to convert an analog signal to a corresponding digital signal. The A/D converter 18 converts the audio signal 44 input from the microphone 16 to digital audio data 46 to supply the resultant data to the transmitter input terminal Sin (34).

The transmitter input terminal Sin (34) is connected for receiving the near-end input signal or near-endtalker signal 46 outputted from the A/D converter 18. The near-end input signal 46 is a signal including an echo component and is supplied to the cancellation adder 20 and the ACANC calculator 28. The transmitter output terminal Sout (36) is connected for transmitting the output signal 48 from the cancellation adder 20 toward the far-end listener.

The cancellation adder 20 has a function to add a pseudo-echo signal to the received audio data to thereby cancel the echo component included in the received audio data. The cancellation adder 20 receives the near-end input signal 46 inputted from the transmitter input terminal Sin (34) on its one terminal 50 and the pseudo-echo signal y'(n) (54) from the ADF 24 on its other terminal 52. The cancellation adder 20 adds the near-end input signal 46 and the pseudo-echo signal y'(n) (54) to each other to thereby cancel the echo component y(n) included in the near-end input signal. The cancellation adder 20 outputs a residual signal e(n) (48) resultant from the addition to the ADF 24, the ACANC calculator 28, and the transmitter output terminal Sout (36).

The VAD 26 has a function to determine whether or not a voiced component, or voice activity, is included in an input signal to issue a result of the determination. The VAD 26 determines whether or not voice activity is included in the far-end input signal x(n) 38 inputted from the receiver input terminal Rin (30), and outputs, when having determined an inclusion of the voice activity, a flag (v_flg=1) (56) representing a result of the detection of the voice activity to the ACANC calculator 28.

The ACANC calculator 28 has a function to calculate the average value of an amount of echo cancellation on the basis of the power of an input signal inputted to the cancellation adder 20 and the power of an output signal outputted from the cancellation adder 20. The ACANC calculator 28 also has functions to reflect the amount of echo cancellation having its nature of correspondingly increasing with convergence to update the average value of the amount of echo cancellation accordingly, i.e. on a real-time basis, as well as to determine whether or not a variation in the current average value of the amount of echo cancellation becomes smaller than that in the previous average value to thereby determine whether or not the ADF 24 converges.

The ACANC calculator 28 is responsive to a variation in the updated average value of the amount of echo cancellation being smaller than that in the previous average value to determine that a change in a coefficient of the ADF 24 converges to supply the coefficient selector 22 with a flag (svp_flg) 58 representing a convergence determination as a result of the detection of the voice activity and the current amount of echo cancellation ACANC_UP(nT) (60). This amount of echo cancellation ACANC_UP(nT) (60) may also be referred to as an amount of echo cancellation for convergence period. In the present illustrative embodiment, when having detected the convergence state of the ADF 24, the flag suv_flg (58) takes its binary value "1", for example, which will be supplied to the coefficient selector 22.

The ADF 24 has a function to receive the far-end input signal x(n) (38) and the output signal e(n) (48) from the cancellation adder 20 to generate the pseudo-echo signal y'(n) (54) and the tap coefficient 60. The ADF 24 outputs the generated pseudo-echo signal y'(n) (54) to the cancellation adder 20. The ADF 24 outputs the generated tap coefficient 62 also to the coefficient selector 22.

Figure 2:
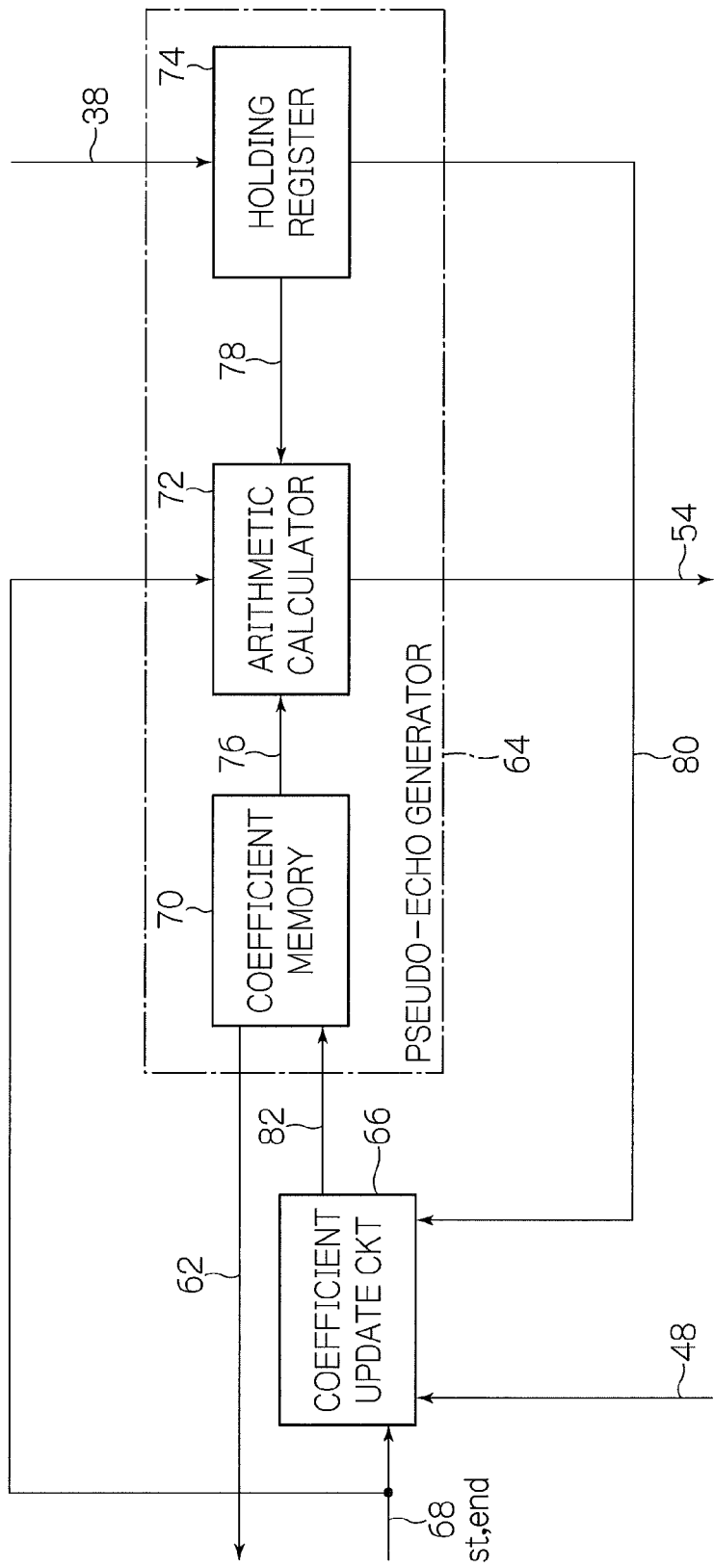
FIG. 2 is a schematic block diagram showing the configuration of an adaptive filter (ADF) shown in FIG. 1.

Now, a schematic configuration of the ADF 24 is shown in FIG. 2. The ADF 24 includes at least a pseudo-echo generator 64 and a coefficient update circuit 66, which are interconnected as depicted. The pseudo-echo generator 64 has a function to generate a pseudo-echo signal in response to a control signal 68 supplied for directing a pseudo-echo signal to be generated. The control signal 68 is provided from the coefficient selector 22 and includes, or designates, a tap starting point st and a tap ending point end. The pseudo-echo generator 64 includes a coefficient memory 70, an arithmetic calculator 72, and a holding register 74, which are interconnected as illustrated.

The coefficient memory 70 is adapted to store filter coefficients. The coefficient memory 70 stores a plurality (N) of coefficient values, which may be treated as a coefficient vector 76, where N is a natural number. The coefficient memory 70 outputs the coefficient vector 76 to the arithmetic calculator 72. In this embodiment, the number N is set to 1024, but may not be restrictive. The coefficient memory 70 outputs the tap coefficient 62 also to the coefficient selector 22.

The arithmetic calculator 72 has a function to calculate a sum of products on the basis of a coefficient vector and a held data vector to obtain the pseudo-echo signal y'(n) (54). The arithmetic calculator 72 receives the control signal 68 including the tap starting point st and the tap ending point end from the coefficient selector 22, and uses the tap coefficients for (st,end) 68 falling between the received tap starting point st and tap ending point end to calculate a sum of products. The arithmetic calculator 72 is supplied with a data vector 78.

The holding register 74 is adapted to store the far-end input signal x(n) (38) from the receiver input terminal Rin (30). The holding register 74 stores N past samples, which are treated as the data vector 78. The holding register 74 outputs the data vector 78 to the arithmetic calculator 72.

The coefficient update circuit 66 has a function to receive the residual signal e(n) (48) from the cancellation adder 20 and the data vector 80 of the far-end input signal x(n) (38) from the holding register 74 to update the filter coefficient of the ADF 24 in response to the control signal 68 to output the updated filter coefficient. The coefficient update circuit 66 is provided from the coefficient selector 22 with the control signal 68 including the tap starting point st and the tap ending point end. The coefficient update circuit 66 receives the supplied residual signal e(n) (48) and the data vector 80 of the signal x(n), and processes the inputted data 80 by means of an algorithm to thereby update the tap coefficients for the control signal (st,end) 68 covering the received tap starting point st to the received tap ending point end. The coefficient update circuit 66 outputs the updated tap coefficients 82 to the coefficient memory 70 of the pseudo-echo generator 64. The coefficient memory 70 stores the updated tap coefficients 82 thus supplied.

Returning to FIG. 1, the coefficient selector 22 has a function to determine the number of taps of the ADF 24. The coefficient selector 22 calculates, in order to determine the number of taps, a sum total of power of tap coefficients of the ADF 24 in the coefficient memory 70 and a partial total of power of tap coefficients, and then obtains a ratio of the sum total of power of tap coefficients to the partial total of power of tap coefficients. The coefficient selector 22 then uses the amount of echo cancellation calculated by the ACANC calculator 28, the calculated ratio and a threshold value $\delta_{ACANC}$ for stabilizing the performance to determine the effective number of taps of the ADF 24 useful for suppressing an echo. The coefficient selector 22 outputs the control signal 68 including the determined effective number of taps to the ADF 24.

Additionally, the coefficient selector 22 supplies the tap starting point st and the tap ending point end as the determined effective number of taps of the ADF 24 useful for suppressing an echo to the coefficient update circuit 66 and the arithmetic calculator 72 of the ADF 24, as described above.

This enables coefficients to be updated only for the effective number of taps of the ADF 24 useful for suppressing an echo, and can be used to generate a pseudo-echo signal.

Therefore, a wasteful processing for updating tap coefficients can be eliminated to render the filter coefficients reduced. The ADF 24 can thus be improved in response speed in cancelling echo accordingly. Furthermore, echo cancellation performance can be maintained as of the convergence. Therefore, for example, a telephonic conversation can be accomplished free from feeling echo.

Next, processing steps in the echo canceller 10 in accordance with the instant embodiment will be described in detail. The echo canceller 10 is reached by the audio signal from a far-end talker, not shown, in the form of digitized receiver audio signal 38. The receiver audio signal x(n) is inputted to the VAD 26, the ADF 24, and the receiver output terminal Rout (32). The operation of the VAD 26 and the ADF 24 will be described below. Note that a variable n indicates the order of sampling.

A signal outputted from the receiver output terminal Rout (32) is converted to a corresponding analog signal in the D/A converter 12, and then converted to the audible sound 42 by the loudspeaker 14. The audio sound 42 emitted from the loudspeaker 14 is provided to a near-end listener, not shown, and may partially be caught by the microphone 16 to be inputted in the form of signal y.

The signal y inputted by the microphone 16 is converted to a corresponding digital signal 46 in the A/D converter 18 to be outputted as an echo component y(n) to the cancellation adder 20 and the ACANC calculator 28.

The pseudo-echo signal y'(n) (54) output from the ADF 24 is provided to a subtraction input terminal 52 of the cancellation adder 20 to be cancelled out by the cancellation adder 20 with the echo component y(n) (46) supplied from an addition input terminal 50.

The output signal e(n) (48) from the cancellation adder 20 is delivered to the ACANC calculator 28 and the transmitter output terminal Sout (36). The output signal e(n) (48), which may be dealt with as a residual signal, is also outputted to the ADF 24. The residual signal e(n) (48), as described below, is used for updating coefficients of the ADF 24.

The signal 48 outputted from the transmitter output terminal Sout (36) is transmitted to the far-end listener for a telephonic conversation.

Next, processing in each of the components and elements will be described in detail. First, processing in the VAD 26 will be described. In the echo canceller 10, the audio signal x(n) (38) from the far-end talker is inputted to the VAD 26.

To the voice activity detection by the VAD 26, various techniques may be applied which can detect voice activity in the input signal x(n) (38). In this embodiment, the VAD 26 may be implemented by a voiced section detection.

The VAD 26 calculates a short-term average x_short(n) and a long-term average x_long(n) of |x(n)| by using expressions (1) and (2):

$$x\_short(n) = \delta s \cdot |x(n)| + (1.0 - \delta s) \cdot x\_short(k-1) \quad (1)$$

$$x\_long(n) = \delta l \cdot |x(n)| + (1.0 - \delta l) \cdot x\_long(k-1), \quad (2)$$

where $\delta s$ and $\delta l$ are constants for determining an average response speed. The constant $\delta s$ is in the range of $0 < \delta s \leq 1.0$, and the constant $\delta l$ is in the range of $0 < \delta l \leq 1.0$.

When a voice activity detection condition defined by an expression (3):

$$x\_short(n) \geq x\_long(n) + VAD12\_m \text{ (dB)} \quad (3)$$

is satisfied, it is determined "voiced", and otherwise "unvoiced".

When the constants $\delta s$ and $\delta l$ are larger, the echo canceller 10 sensitively responds to a change in a signal in a time domain, but, on the negative side, can be readily sensitive to background noise. Conversely, when the constants $\delta s$ and $\delta l$ are smaller, the echo canceller 10 generally or roughly responds to a signal component and is insensitive to noise.

In the instant embodiment, the constant $\delta s$ is set to 0.4, the constant $\delta l$ is set to 0.002, and VAD12$_{\_m \text{ is set to}}$ 6 dB. However, the invention may not be restricted to these specific values. Additionally, the expression (3) is expressed in dB unit. However, instead of dB unit, the expression (3) may normally be represented by $$x\_short(n) \geq x\_long(n) \times VAD12\_mlin \quad (3a)$$

Now, in this case, a value of VAD12_mlin is set to 2.0. Additionally, the constants $\delta s$ and $\delta l$ may preferably be changed to proper values depending on a sampling frequency. Alternatively, for example, not depending on a sampling frequency, but surely the constants $\delta s$ and $\delta l$ may be set to respective values corresponding to the positive-going edges of 20 msec and 5 sec.

Next, described will be how the ACANC calculator 28 calculates the amount of echo cancellation and determines the convergence state of a change in the coefficient of the ADF 24.

The ACANC calculator 28 calculates, when receiving an output of a voice activity detection signal v_flg=1 (56) from the VAD 26, the amount ACANC of echo cancellation from power of input and output signals of the cancellation adder 20. The reason for this is that the amount of echo cancellation does not have to be calculated while no echo is involved. This is based on a concept that the amount of echo cancellation may be calculated only in a voiced section.

The ACANC calculator 28 receives the input signal y(n) (46) from the transmitter input terminal Sin (34) and the output signal e(n) (48) from the cancellation adder 20, and calculates an instantaneous value ACANC_S(n) of the amount of echo cancellation by using an expression (4):

$$ACANC\_S(n) = 10 \log_{10}\{(y^2(n))/(e^2(n))\} \quad (4)$$

The present embodiment is adapted to use the power of signals as with the expression (4). Alternatively, the bsolute values of signals may be used as defined by an expression (5):

$$ACANC\_S(n) = 20 \log_{10}\{|y(n)|/|e(n)|\}, \quad (5)$$

where |x| represents the absolute value of x.

Next, the ACANC calculator 28 calculates a smoothing value ACANC_L(n) of the amount of echo cancellation by an expression (6):

$$ACANC\_L(n) = \delta \cdot ACANC\_L(n-1) + (1-\delta)ACANC\_S(n) \quad (6)$$

In the expression (6), a constant $\delta$ indicates the degree of smoothing and satisfies the relationship of an expression (7):

$$0 < \delta < 1.0 \quad (7)$$

When the constant $\delta$ is smaller, a response speed to the instantaneous value ACANC_S(n) increases, but at the same time the influence of a possible noise component readily increases. By contrast, when the constant $\delta$ is larger, a rough change in the instantaneous value ACANC_S(n) tends to be reflected whereas the influence of a noise component decreases. This embodiment exemplarily applies $\delta = 0.998$. However, the present invention may not be restricted to this specific value.

Additionally, as appreciated from the expressions (4) and (5), while the ADF 24 progresses in its adaptation so as to exert performance for suppressing an echo, the instantaneous value ACANC_S(n) of the amount of echo cancellation and the smoothing value ACANC_L(n) increase.

The ACANC calculator 28 uses the calculated smoothing value ACANC_L(n) to calculate an elevated value ACANC_UP(nT) (60) of the smoothing value ACANC_L(n) of the amount of echo cancellation at a predetermined time interval nT by an expression (8) if ACANC_L(n)>ACANC_UP(nT):

$$ACANC\_UP(nT) = ACANC\_L(n) \quad (8)$$

and another expression (9) if ACANC_L(n)≦ACANC_UP(nT):

$$ACANC\_UP(nT) = ACANC\_UP((n-1)T) \quad (9)$$

In other words, these expressions mean that the elevated value ACANC_UP(nT) calculated at previous timing nT is compared with the newest current sampled value ACANC_L(n), and the elevated value ACANC_UP(nT) (60) is continuingly updated to a new value when larger.

Furthermore, the ACANC calculator 28 calculates, after calculating the expression (8), it is determined by an expression (10) how the degree of magnitude of the elevation diff_ACANC is:

$$diff\_ACANC(nT) = ACANC\_UP(nT) - ACANC\_UP((n-1)T) \quad (10)$$

The ACANC calculator 28 also determines whether or not an expression (11) is satisfied:

$$diff\_ACANC(nT) \leq diff\_ACANC((n-1)T) + \delta 2 \quad (11)$$

Now, a value δ2 is set to 2 dB. However, the present invention may not be restricted to this specific value.

Moreover, when the expression (11) is true, the ACANC calculator 28 determines that a change in the coefficient of the ADF 24 converges, and outputs the results suv_flg=1 (58) and ACANC_UP(nT) (60) to the coefficient selector 22.

Next, processing in the ADF 24 will be described with reference to FIGS. 1 and 2. First, the holding register 74 shown in FIG. 2 receives the signal x(n) (38) from the receiver input terminal Rin (30) to store this signal.

At this time, the holding register 74 treats the input signal x(n)

$$x(n) = [x(n)\, x(n-1) \ldots x(n-N+1)]^t \quad (12)$$

as a data vector. In other words, N past samples are stored. In the expression, n indicates the order of sampling, and N indicates the number of taps of the ADF 24 and is set to, for example, 1024. However, the present invention may not be restricted to this specific value. A notation t indicates transpose of a matrix.

Additionally, the coefficient memory 70 stores filter or tap coefficients, not shown. The coefficient memory 70 has N coefficients stored. The values of the coefficients, as described below, are momentarily updated by the coefficient update circuit 66.

The N coefficients in the coefficient memory 70 are treated as one coefficient vector as described by an expression (13):

$$H(n) = [h(0)\, h(1) \ldots h(N-1)]^t, \quad (13)$$

where N indicates the number of taps of the ADF 24.

The arithmetic calculator 72 receives the coefficient vector of the coefficient memory 70 and the data vector of the holding register 74, and calculates the pseudo-echo signal y'(n) as described by an expression (14):

$$y'(n) = \sum_{i=st}^{end} h(i)x(n-i) \quad (14)$$

where y'(n) is the sampling data of the pseudo-echo. The pseudo-echo signal y'(n) is scalar data having a single value.

Now, the values of variables st and end are included in the control signal 68 from the coefficient selector 22 described below. The initial value of the variable st is equal to zero, and the value of the variable end is equal to N−1. Accordingly, the arithmetic calculator 72 calculates in the initial condition the sum of products of the N pieces of past sampling data and the coefficients of the N taps to generate the pseudo-echo signal y'(n). The pseudo-echo signal y'(n) thus generated is outputted to the terminal 52 of the cancellation adder 20.

To the cancellation adder 20, the echo component y(n) caused by the microphone 16 from the loudspeaker 14 as described above is inputted on the terminal 50. The cancellation adder 20 calculates the residual signal e(n) (48) by additive cancellation, i.e. substraction, of the echo component y(n) and the pseudo-echo signal y'(n) by an expression (15):

$$e(n) = y(n) - y'(n) \quad (15)$$

The residual signal e(n) (48) is outputted to the transmitter output terminal Sout (36).

The output signal 48 from the transmitter output terminal Sout (36) is sent as an audio signal to the far-end listener side. The residual signal e(n) from the cancellation adder 20 is also outputted to the coefficient update circuit 66.

The coefficient update circuit 66 uses the known NLMS (Normalized Least-Mean-Squares) algorithm on the residual signal e(n) (48) and a received signal vector x(n) (80) from the holding register 74 to update the filter coefficients of the adaptive filter as described by an expression (16):

$$H(n+1) = H(n) + \alpha \frac{x(n)e(n)}{\sum_{i=st}^{end} x^2(n-i)} \quad (16)$$

Now, the sum totals st and end described in the denominator of the second term in the right-hand side of the expression (16) are the same as the expression (15). The expression (16) represents that the coefficient vector used for generating the next pseudo echo is generated from the residual signal e(n) and the far-end input signal x(n).

The coefficient update circuit 66 outputs the generated coefficient vector 82 to the coefficient memory 70, and prepares for generating the next pseudo-echo signal y'(n). Repeating the updating several times, the update of the coefficient of the expression (16) progresses, and then the residual signal e(n) (48) of the expression (15) gradually decreases.

Before long, e(n) becomes smaller enough, and then the update of the coefficients by the expression (16) hardly causes the coefficients to be changed. This is the "condition of the ADF having converged."

As described above, when the output from the VAD 26 indicates "voiced", in the echo canceller the ADF 24 predominantly operates to identify and cancel the echo.

In this way, the ADF 24 updates, as receiving the far-end input signal x(n) (38), the tap coefficients of the filter of the ADF 24 so as to minimize the power of the residual signal e(n) (48).

When no noise component is involved in the signal from the near-end talker, the update of a filter tap coefficient is automatically stopped at the timing of e(n)=0, and thereafter the condition of canceling the echo is maintained.

Next, the operation of the coefficient selector 22 for selecting coefficients will be described. The coefficient selector 22 receives the flag (suv_flg) (58) representing a result of the detection of the voice activity and the elevated value ACANC_UP(nT) (60) from the ACANC calculator 28, and receives the filter coefficient 62 from the ADF 24.

The coefficient selector 22 determines from the filter coefficient 60 a filter coefficient of the ADF 24 which coefficient is to actually work as a tap coefficient of the ADF 24 in a fashion as described below, for example. When the flag suv_flg is not enabled, the coefficient selector 22 does nothing.

Additionally, the coefficient selector 22 calculates, when receiving the flag suv_flg=1 from the ACANC calculator 28, a power log characteristic of the filter coefficient of the ADF 24 by using an expression (17):

$$\text{POW\_LOG}(m) = 10\log_{10}\left\{\frac{\sum_{i=0}^{N-1} h_i^2(t)}{\sum_{i=M}^{N-1} h_i^2(t)}\right\}, \quad (17)$$

where a variable m indicates that the calculation is at the m-th tap position. A variable N indicates the number of all the taps of the ADF 24.

The denominator of the expression (17) represents a sum total of power of the m-th to the final tap coefficients, inclusive. The numerator of the expression (17) represents a sum-total of power of the filter tap coefficients corresponding to the whole tap length of the ADF 24. Additionally, the expression (17) has the same meaning as an expression (17a):

$$\text{POW\_LOG}(m) = 10\log_{10}\left\{\frac{\sum_{i=0}^{N-1} h_i^2(t)}{\sum_{i=0}^{N-1} h_i^2(t) - \sum_{i=0}^{M-1} h_i^2(t)}\right\} \quad (17a)$$

Well, the meaning of the expressions (17) and (17a) will be, since being important for the present invention, described in more detail with reference to FIG. 3.

Figure 3B:
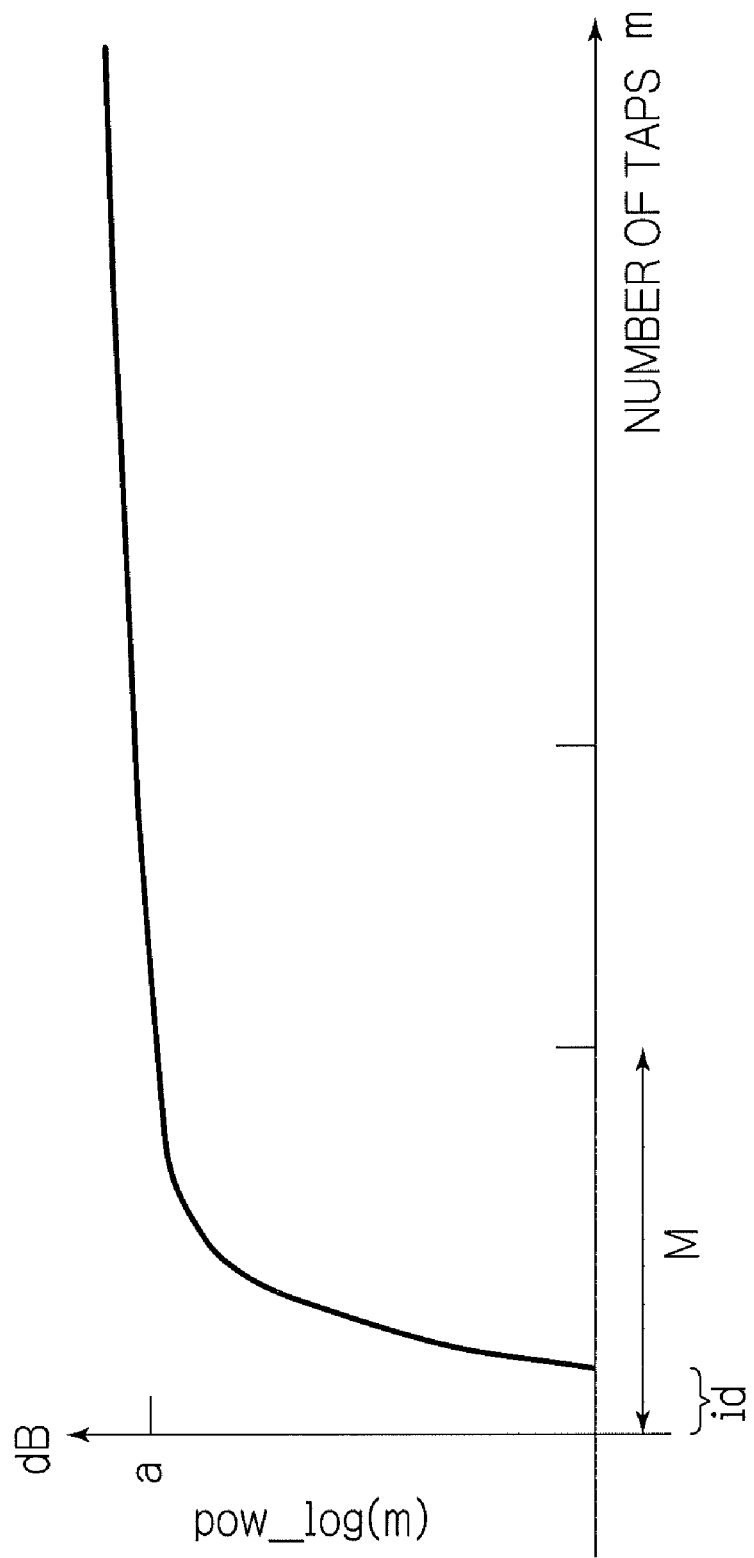
FIG. 3B is a graph showing the relationship between a tap coefficient of the ADF and a power log characteristic, POW_LOG(m) in the echo canceller shown in FIG. 1.

The above-described amount of echo cancellation calculated by the ACANC calculator 28 is calculated on the basis of the ratio of power of two signals, in other words, the expression (4). Now, the amount of echo cancellation is assumed to be equal to a [dB] as shown in FIG. 3B.

This amount of echo cancellation of a [dB] can be considered by being replaced with an impulse response waveform of an echo path, in other words, a partial power ratio of the converging tap coefficient values of the ADF 24. The mechanism therefor will first be considered on the assumption that the influence of noise at the near-end side is small. The echo data y(n) (46) in FIG. 1 corresponds to a response waveform of the echo path of the whole echo in FIG. 3A, in other words, the whole power of the N taps of an impulse response.

The coefficient tap of the echo canceller, as described above, is described by simulating the impulse response of the echo path when the ADF 24 converges. In the case of NLMS algorithm in this embodiment, a response waveform is described as a simulated waveform of an echo path temporal waveform.

However, the ADF 24 cannot cover, because of its finite filter length, the infinite length of the whole echo path. Therefore, many of conventional echo cancellers took solutions in which a designer assigns in advance such a sufficiently long tap length N as possible in practice at the cost of redundancy, or inversely in which the resource of a memory is assigned as much as possible to result in the tap length N.

If, rather than the whole length N of the filter length, such a shorter tap length is employed that has M taps from the starting point 0 than the whole length, then the echo canceller handles echo cancellation only for the tap length M and does not assign the coefficient taps to the remaining (N−M) taps, as shown in FIG. 3A. Therefore, the echo cannot completely be cancelled. In other words, the power of this unassigned part corresponds to residual power $e^2(n)$ from cancellation.

The amount of echo cancellation, i.e. input-to-output power ratio of the cancellation adder 20, represents how much echo could be cancelled among the entire echo. In other words, this can be used for an index for indicating how many taps of the entire N taps function effectively.

FIG. 3B shows a characteristic of a power log POW_LOG(m) of the expression (17). This characteristic may be easy to understand by making its temporal axis correspond to that of the waveform of the tap coefficient of the ADF 24 shown in FIG. 3A.

The power log POW_LOG(m) has a value not changed during a period of initial delay (id) of the echo path. However, after the time id, as the number of taps m increases, the power log is elevated. For example, when the number of taps m=M, the power log represents a ratio of a [dB] to the whole.

As appreciated from FIG. 3B, after the number of taps m=M, even when the number of taps m increases, the power log POW_LOG(m) is not elevated very much. Therefore, in the ADF 24, even when the tap length is increased to exceed M to some extent, improvement of the cancellation performance is almost plateaued, which is reflected on the power log. This is caused by a reflection of such a known physical nature that an echo over an acoustic echo path in space "gradually attenuates while repeating reverberation", and that "the later in time, the more moderate reverberation".

By considering the nature of the echo path, it is appreciated that, if the echo canceller once converges and the amount of echo cancellation can be measured, the number of coefficient taps maintaining the echo cancellation performance at this timing can then be calculated as a practical problem from the relationship between the calculated amount of echo cancellation and the power log POW_LOG(m) of a coefficient register.

Thus, the coefficient selector 22 actually uses the elevated value ACANC_UP(nT) of the ACANC calculator 28, and finds the number of taps m satisfying an expression (18):

$$\text{POW\_LOG}(m) = 10\log_{10}\left\{\frac{\sum_{i=0}^{N-1} h_i^2(t)}{\sum_{i=M}^{N-1} h_i^2(t)}\right\} + \delta_{ACANC} \geq \text{ACANC\_UP}(nT) \quad (18)$$

A threshold value $\delta_{ACANC}$ is a constant for ensuring a margin of the number of taps, namely, a margin threshold value. In the present embodiment, the margin threshold value $\delta_{ACANC}$ is used as $\delta_{ACANC}$=3 dB. However, the present invention may not be restricted to this specific value.

Returning to FIGS. 3A and 3B, when cancellation performance of a [dB] can be actually exerted, the number of taps m is equal to M. When the performance higher than a [dB] cannot be actually exerted due to near-end noise or the like, the value m smaller than M is automatically calculated.

The coefficient selector 22 outputs the tap length m obtained by a calculation of the expression (18) as the tap ending point end to the coefficient update circuit 66 of the ADF 24.

Additionally, in the instant embodiment, the coefficient selector 22 outputs the tap starting point st=0 to the coefficient update circuit 66 of the ADF 24. However, an alternative may be applied to read below.

The echo path initial delay id shown in FIG. 3B can also be set to a value predetermined with the distance taken into account between the loudspeaker 14 and the microphone 16 specific for the echo canceller 10. In such a case, from the sound velocity sv and the distance d between the loudspeaker 14 and the microphone 16, an initial delay sample st may be calculated by either $$st=(d/sv)\times(\text{Sampling Interval}), \text{ or}$$

$$st=d/(sv\times\text{Sampling Interval}).$$

The initial delay sample obtained by the expressions may be set as the tap starting point. The coefficient update circuit 66 of the ADF 24 updates, when receiving the tap starting point st and the tap ending point end from the coefficient selector 22, for example, only the tap coefficients from the tap starting point st to the tap ending point end, as calculated by the expression (16), without updating the remaining tap coefficients.

Furthermore, the coefficient selector 22 also outputs the control signal 68 including the tap starting point st and the tap ending point end to the arithmetic calculator 72 of the ADF 24.

The arithmetic calculator 72 uses only data from the tap starting point st to the tap ending point end among the filter coefficients of the coefficient memory 70 and data of the holding register 74 to generate the pseudo echo from the expression (14).

It is to be noted that the instant embodiment is adapted to use only data from the tap starting point st to the tap ending point end without using the remaining coefficient registers of the coefficient memory 70 for the calculation, but may be further adapted to reset the remaining part.

Additionally, as described above, the coefficient selector 22 outputs, while maintaining the once achieved echo cancellation performance, to the ADF 24 the tap starting point st and the tap ending point end for reducing the number of taps of the filter. Then, the ADF 24 uses only the filter coefficients from the tap starting point st to the tap ending point end and data of the holding register 74 to continue its echo cancelling operation.

In summary, in the echo canceller 10 in the illustrative embodiment, when the VAD 26 detects voice activity, the ACANC calculator 28 finds the amount of echo cancellation, and the coefficient selector 22 uses the amount of echo cancellation under the condition of the ADF 24 converging to calculate a sum total of power of tap coefficients and a partial total of power of tap coefficients, and calculates a ratio therebetween to determine the effective number of taps of the ADF 24 useful for currently suppressing an echo. The ADF 24 updates only the coefficients of these determined taps, and generates a pseudo-echo signal.

As a result, in accordance with the instant illustrative embodiment, once tap coefficients are restricted or defined, filtering for generating a pseudo-echo signal with redundant filter tap coefficients is refrained from, and wasteful updating of coefficients is rendered unnecessary, as well as the filter coefficients are allowed to be short. Thus, the response speed of the ADF 24 to a change in echo path can be improved.

Additionally, the echo cancellation performance can be maintained as from the convergence period. Thus, an echo canceller may be provided which implements a communication apparatus free from feeling echo during conversation.

Well, an alternative embodiment of the echo canceller 10 in accordance with the present invention will be described. In the alternative embodiment, similarly to the preceding embodiment, once filter taps are restricted, the restriction on assignment of the taps is once released in response to deterioration in the echo cancellation performance due to a change in echo path to revert to a restriction process on the effective taps.

Generally, when the echo canceller of the present invention is applied to a system for use in such an environment that a talker, such as a desk worker, does not move very much, the restriction operation for taps and echo cancellation operation by a certain number of taps, as with the preceding embodiment, can often exert sufficient performance for suppressing echo. However, application to, for example, an automobile telephone involves different circumstances. The driver, while driving a car, often causes a change in echo path.

The alternative embodiment is directed to an echo canceller capable of operating even in an application of its performance for suppressing echo fluctuable due to a change in echo path. Specifically, this echo canceller 10 is based on a concept of restoring itself, after restricting the operative tap coefficients, from deterioration in the echo cancellation performance due to a change in echoing condition caused by an external factor.

Figure 4:
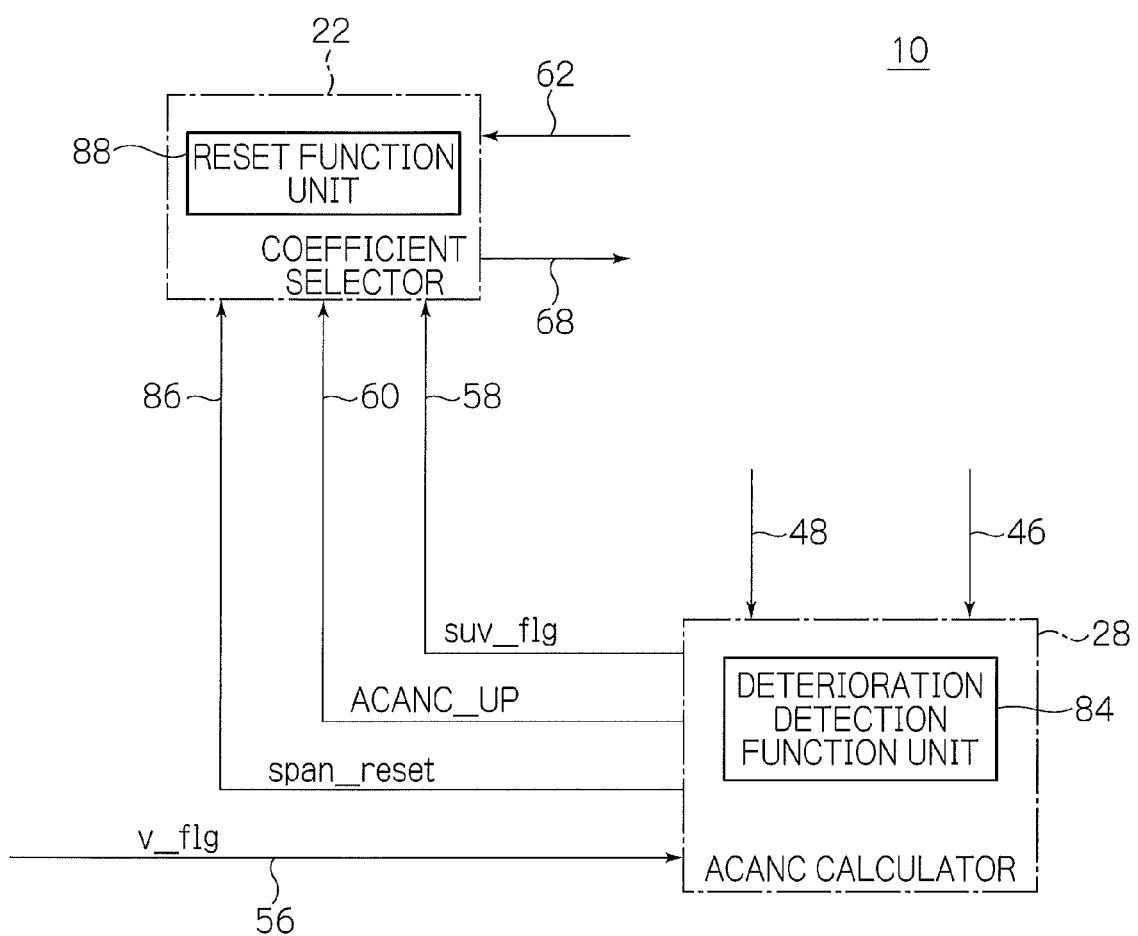
FIG. 4 is a schematic block diagram partially showing functions added to a coefficient selector and an ACANC calculator in the echo canceller shown in FIG. 1.

The alternative embodiment may be the same as the preceding embodiment except for the coefficient selector 22 and the ACANC calculator 28 including additional functions. In the drawings, FIG. 4 shows only the main sections of the coefficient selector 22 and the ACANC calculator 28 different from those of the echo canceller 10 shown in FIG. 1.

The illustrative embodiments are depicted and described as configured by separate functional blocks, such as coefficient selector 22. It is however to be noted that such a depiction and a description do not restrict the embodiments to an implementation only in the form of hardware but they may partially or entirely be implemented by software, namely, by a computer, or processor system, which has a computer program installed and functions, when executing the computer program, as part of, or the entirety of, the embodiments. That may also be the case with illustrative embodiments which will be described below. In this connection, the word "circuit" or "function unit" may be understood not only as hardware, such as an electronics circuit, but also as a function that may be implemented by software installed and executed on a computer.

First, the ACANC calculator 28 will be described. The ACANC calculator 28, in addition to the processing described in connection with the preceding embodiment, has a deterioration detection function unit 84 for continuingly updating a calculated value of the amount of echo cancellation even after restricting the tap coefficients, and detecting a deterioration in the echo cancellation performance, due to a change in echo path after restricting the tap coefficients, on the basis of a decrease in the calculated value of the amount of echo cancellation. The deterioration detection function unit 84 supplies, when detecting such a deterioration, a deterioration detection signal or an echo cancellation performance deterioration signal span_reset (86) to the coefficient selector 22.

The ACANC calculator 28 operates similarly to the preceding embodiment until calculating the expression (11). Furthermore, the ACANC calculator 28 sets, when receiving the flag v_flg=1 (56) from the VAD 26, the smoothing maximum value ACANC_MAX of the amount of echo cancellation in the deterioration detection function unit 84 even after restricting the coefficient tap. Expressions (19) and (20) are used to continuously update the elevated value ACANC_UP (nT) (60):

$$ACANC\_MAX = ACANC\_UP(nT) - \delta 20 \quad (19)$$

if ACANC_UP(nT)≧ACANC_MAX, or $$ACANC\_MAX = ACANC\_MAX \quad (20)$$

if ACANC_UP(nT)<ACANC_MAX.

This is different from the preceding embodiment. In the expressions, δ20 is a constant. The constant δ20 satisfies the relationship of δ20≦δ2. In the alternative embodiment, the constant δ20 is set to 1 dB. However, the present invention may not be restricted to this specific value.

The expression (19) is used to reflect, after the elevated value ACANC_UP(nT) is stable, the elevated value ACANC_UP(nT) on the smoothing maximum value ACANC_MAX of the amount of echo cancellation while updating the elevated value ACANC_UP(nT) on a real-time basis for determining a deterioration in the echo cancellation performance due to a change in echo path, as will be described later.

If an update by the expression (19) results in successful echo cancellation when updating the elevated value ACANC_UP(nT), then the operation of the expression (8) once returns every elevated value ACANC_UP(nT) to the larger smoothing value ACANC_L(n) due to δ20. As a result, the operation of the expression (19) thereafter causes also the smoothing maximum value ACANC_MAX returned to its larger value.

More specifically, the smoothing maximum value ACANC_MAX goes back and forth between the maximum value so far and a value smaller than that maximum value by δ20 [dB]. However, since every difference does not exceed a range of δ2 of the expression (11), the tap coefficient is kept restricted.

When the expression (19) is executed several times, it may happen that the expression (8) is not satisfied but the expression (9), which means in phenomenon that the smaller smoothing value ACANC_L(n) would not allow the elevated value ACANC_UP(nT) to be returned to its larger value.

As described above, since the smoothing value ACANC_L(n) means a long-term smoothing value of the amount of echo cancellation, this situation also represents a decrease in the echo cancellation performance from a point of long-term view. At this time, the smoothing maximum value ACANC_MAX is maintained in the state as defined by the expression (20).

Then, when the flag satisfies the relationship suv_flg=1 and the elevated value ACANC_UP(nT) decreases to a level satisfying the expression (21):

$$ACANC\_MAX \geq ACANC\_UP(nT) - \delta 21 \quad (21)$$

the ACANC calculator 28 outputs a detection signal span_reset=1 to the coefficient selector 22. Otherwise, the ACANC calculator 28 outputs nothing nor the detection signal span_reset.

In the expression, δ21 is a threshold value for starting tap restriction resetting. In the current alternative embodiment, the threshold value δ21 is set to 10 dB. However, the present invention may not be restricted to this specific value. The expression (21) represents subtraction of the threshold value δ21 from the elevated value ACANC_UP(nT). However, an expression (21a)

$$ACANC\_MAX \geq ACANC\_UP(nT) \times \delta 21' \quad (21a)$$

may be alternatively used which is in the form of multiplication by using a value corresponding to a decrease in power by −10 dB, that is, a threshold value δ21'=0.1. To the alternative embodiment, the expression (21) is applied.

Next, the coefficient selector 22 of the alternative embodiment will be described. In addition to the coefficient selector 22 processing as with the preceding embodiment shown in and describedwith reference to FIG. 1, the selector 22 outputs, when receiving the deterioration detection signal span_reset=1 (86) from the ACANC calculator 28, the control signal 68 including the tap starting point st=0 and the tap ending point end=N to the coefficient update circuit 66 of the ADF 24.

Thus, the coefficient selector 22 has a reset function unit 88 for returning the ADF 24 to its initial state for allowing all the taps of the ADF 24 to be operative. This gives rise to the echo canceller 10 being operative with the irreducible minimum number of taps in order to again exert the performance for suppressing the echo on the basis of a change in echo path caused after restricting the number of taps.

The ACANC calculator 28 returns, after completion of outputting the flag suv_flg=1 (58) and the deterioration detection signal span_reset=1 (86), the flag suv_flg (58) to null and also resets all the other internal parameters to restart its operation. Operation following thereto maybe the same as the preceding embodiment.

In short, in accordance with the present alternative embodiment, a change in echo path caused by an external factor can be responded to, but a fluctuation in the amount of echo cancellation or the like is not caused by repeating an improper assignment of the taps. More specifically, an echo canceller can be provided which can automatically detect, even once restricting the taps capable of operating as the ADF, a deterioration in the performance for suppressing echo caused by a possible change in echo path to suppress the echo and again stabilize itself at the minimum number of taps, thereby stably suppressing echo with a small power consumption.

Figure 5:
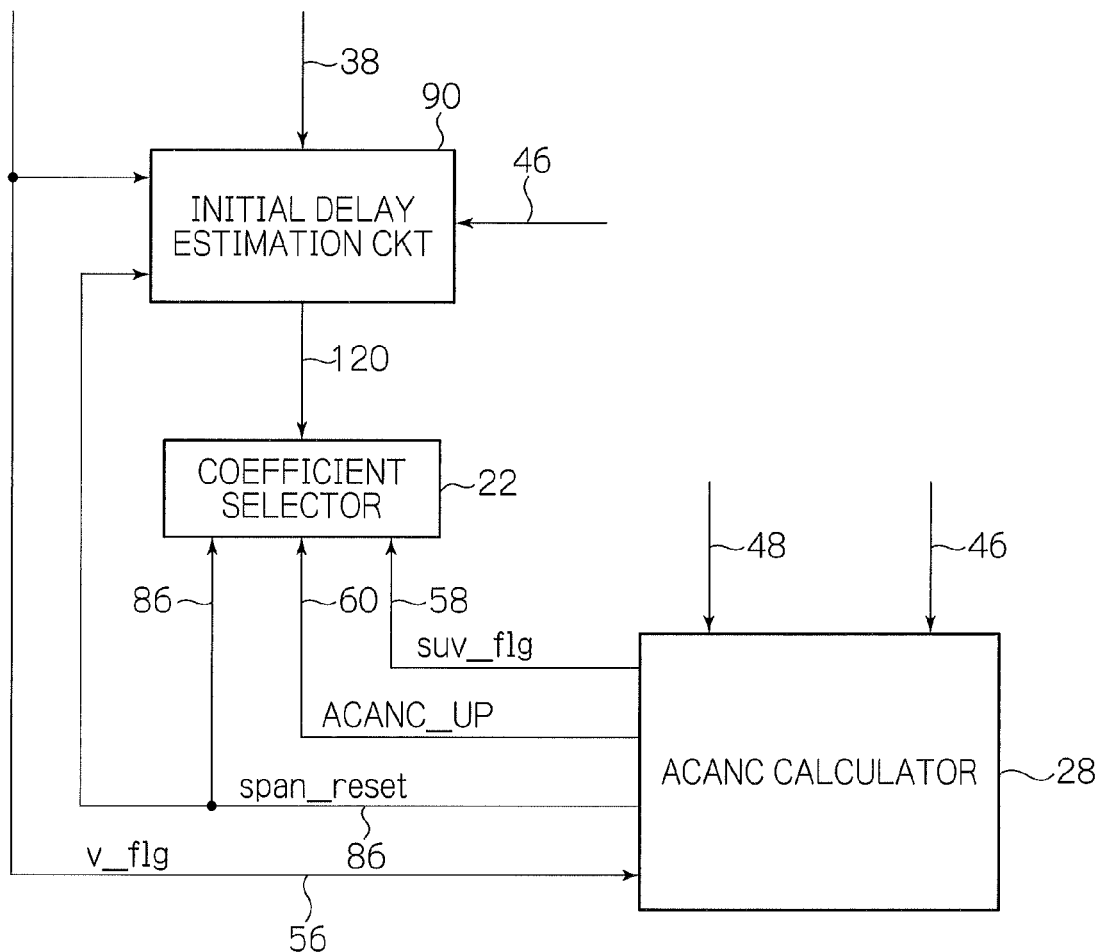
FIG. 5 is a schematic block diagram showing a substantial configuration of an alternative embodiment of an echo canceller to which the present invention is applied.

Next, another alternative embodiment of the echo canceller 10 in accordance with the invention will be described with reference to FIGS. 5, 6, and 7. The echo canceller 10 in the instant alternative embodiment may be the same as the alternative embodiment described above except for additionally include an initial delay estimation circuit 90.

The initial delay estimation circuit 90 has a function to estimate the tap starting points st of the tap coefficients for respective frequency components. The initial delay estimation circuit 90, as shown in FIG. 5, is provided between the D/A converter 12 on the received signal line 38 and the coefficient selector 22. The initial delay estimation circuit 90 is supplied with the far-end input signal x(n) (38), the echo component y(n) (46) included in the near-end input signal, the detection signal v_flg (56) from the VAD 26, and the deterioration detection signal span_reset=1 (86) from the ACANC calculator 28. The deterioration detection signal span_reset=1 (86), as described below, is used in resetting the operation of the initial delay estimation circuit 90.

Figure 6:
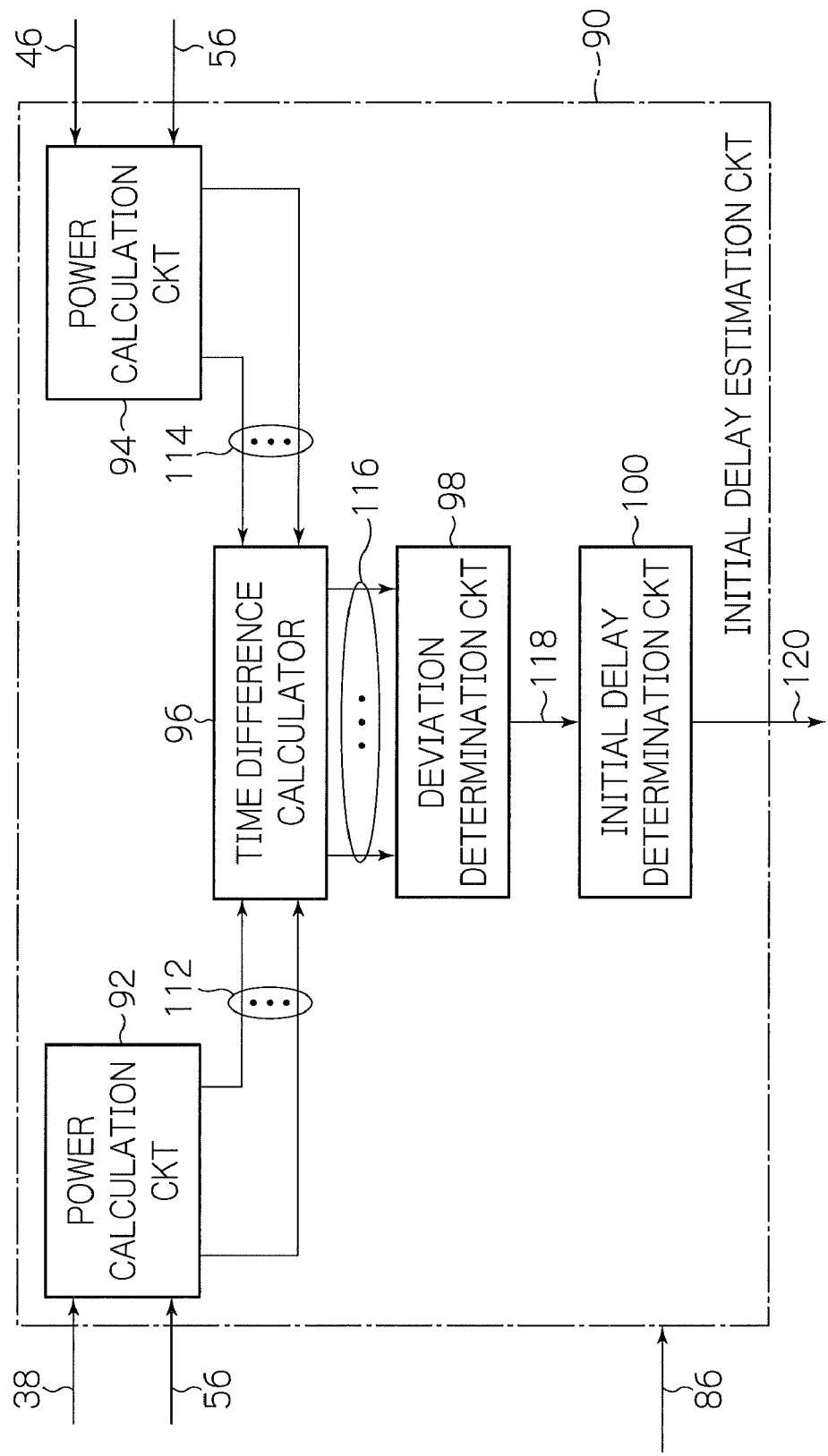
FIG. 6 is a schematic block diagram showing the configuration of an initial delay estimation circuit shown in FIG. 5.

The initial delay estimation circuit 90 includes, as shown in FIG. 6, power calculation circuits 92 and 94, a time difference calculator 96, a deviation determination circuit 98, and an initial delay determination circuit 100, which are interconnected as illustrated.

The power calculation circuits 92 and 94 have a function to frequency-convert a supplied input signal and to calculate power for each frequency. Both the power calculation circuits 92 and 94 may have the same components and elements except for only whether to be supplied with the input signal as the far-end audio signal x(n) (38) from a receiver side or as the near-end audio signal y(n) 46 from a transmitter side. The power calculation circuit 92 as a representative is shown in FIG. 7.

Figure 7:
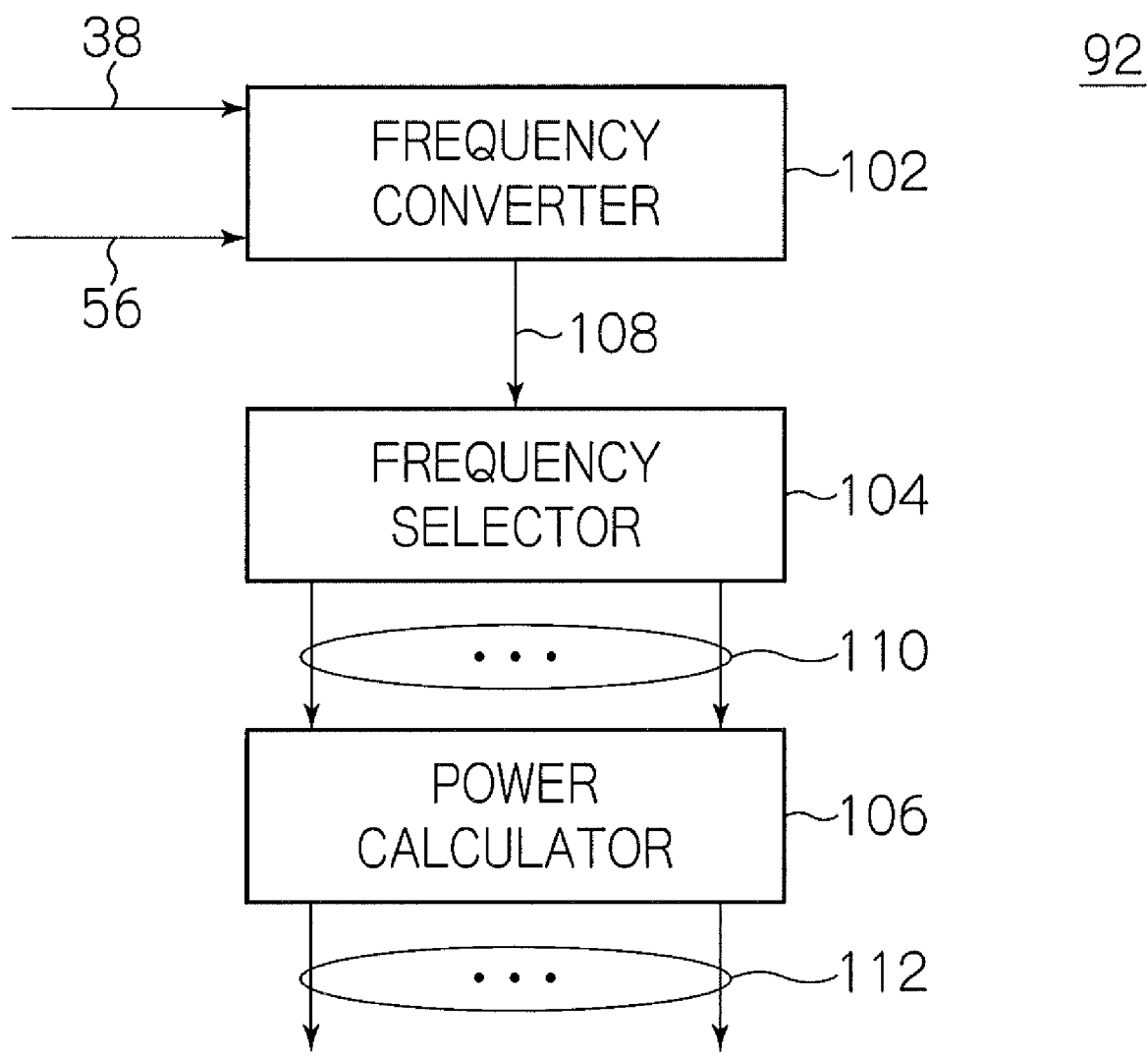
FIG. 7 is a schematic block diagram showing the configuration of a power calculation circuit shown in FIG. 6.

The power calculation circuit 92, as shown in FIG. 7, includes at least a frequency converter 102, a frequency selector 104, and a power calculator 106, which are interconnected as depicted.

The frequency converter 102 has a function to frequency-convert supplied input signals. The frequency converter 102 receives the flag v_flg=1 (56) indicating the presence of a voiced signal from the VAD 26, and converts the far-end input signal x(n) (38) on a temporal axis, or time domain, into a frequency component to output the converted frequency component 108 to the frequency selector 104.

The frequency selector 104 has a function to select the supplied frequency components. The frequency selector 104 selects one or more predetermined frequency components 110 among all the frequency components converted by the frequency converter 102, and outputs the selected frequency components to the power calculator 106.

The power calculator 106 has a function to calculate power of a supplied input signal. The power calculator 106 calculates power for the frequency components selected by the frequency selector 104, and outputs the calculated power 112 as an output of the power calculation circuit 92 to the time difference calculator 96. The power calculation circuit 92 also outputs power 114 calculated for the near-end audio signal y(n) 46 from the transmitter side to the time difference calculator 96.

Returning to FIG. 6, the time difference calculator 96 has a function to calculate a long-term smoothing value of a power value for each of the calculated frequency components supplied from the receiver side and from the transmitter side on the basis of a power value at each frame timing to detect the positive-going edge of each of the frequency components of the receiver and transmitter sides, and further to use a detected positive-going edge time of each of the frequency components of the receiver and transmitter sides to calculate a time difference in positive-going edge time between the receiver and transmitter sides of each frequency component. The time difference calculator 96 outputs the calculated positive-going edge time difference 116 of each frequency component to the deviation determination circuit 98.

The deviation determination circuit 98 has a function to find the maximum value for each frequency component among variations in the calculated positive-going edge time differences of respective frequency components, and determine whether or not the found maximum value of the positive-going edge time difference for each frequency component is equal to or less than a threshold value. Particularly, the deviation determination circuit 98 determines whether or not the positive-going edge time difference for each frequency component falls in a predetermined range, and delivers, when the positive-going edge time difference equal to or less than the threshold value, the minimum time difference among the time differences for the respective frequencies as an initial delay estimation value 118 of the echo path to the initial delay determination circuit 100.

The initial delay determination circuit 100 has a function to hold a plurality of initial delay estimation values for each frequency for each period, and to determine, when these initial delay estimation values fall in a predetermined range in advance, the final initial delay amount of the echo path from these initial delay estimation values. The initial delay determination circuit 100 supplies the coefficient selector 22 with the tap starting point st (120) of the ADF 24 on the basis of the determined initial delay amount.

Next, the operation of the echo canceller 10 in the present alternative embodiment will be described as specifically focused on the initial delay estimation circuit 90 as is characteristic to the embodiment.

The audio signal x(n) (38) from the far-end talker is inputted to the initial delay estimation circuit 90. The initial delay estimation circuit 90 also receives a digital signal inputted on the transmitter input terminal Sin (34), that is, the echo component y(n) (46). The initial delay estimation circuit 90 also receives the flag v_flg (56) indicating a detection of voice activity, i.e. "voiced", from the VAD 26.

The initial delay estimation circuit 90 estimates the initial delay id of the echo path on the basis of those received signals, and outputs a signal st (120) to the coefficient selector 22. The coefficient selector 22, when receiving the signal st (120), sets the tap starting point st to id.

Next, processing in the initial delay estimation circuit 90 will be described in detail with reference to FIG. 7. The far-end input signal x(n) (38) inputted to the initial delay estimation circuit 90 is once stored as a plurality (J) of samples of data corresponding to the length of an analysis window in the frequency converter 102 on the receiver side, where J is a positive integer. With the instant alternative embodiment, eight samples of data are stored.

The frequency converter 102 on the receiver side converts, when receiving the flag v_flg=1 indicating "voiced" from the VAD 26, the input signal 38 in the time domain to a signal component in the frequency domain.

Now, the conversion to a frequency may not be restricted to specific manners, but can be implemented by applying various manners. For example, the known FFT (Fast Fourier Transform) may be used. Alternatively, a filter bank may be used which has band-pass filters of abrupt characteristics aligned for respective bandwidths. In the instant alternative embodiment, the FFT adaptive to eight samples is used. In the instant alternative embodiment, a sampling frequency is set to 8,000 Hz, and thus the frequency components resultant from the FFT are found in the segments of 1,000 Hz distributed from 1,000 Hz to 8,000 Hz. However, the components from 5,000 to 8,000 Hz actually correspond to the folds of the components from 1,000 to 4,000 Hz.

Now, by setting the analysis window length correspondingly to the J samples, the number of calculated frequency components is also equal to J. As described above, since the half of the frequency components actually has the same values as the corresponding residual components folded with respect to the center frequency, the number of frequency components requiring different processing is equal to J/2. However, for the sake of simplicity in description, description will be continued on the assumption of the plurality (J) of frequency components.

The frequency converter 102 on the receiver side frequency-converts the plurality (J) of signals x(n), where n=1, ..., J, to the plurality (J) of frequency components X(fn) for every J predetermined samples, i.e. every frame, to output the converted frequency components to the frequency selector 104 on the receiver side.

The frequency selector 104 on the receiver side selects several frequency components among the frequency components X(fn) in a predetermined manner.

Now, in an exemplary manner for selecting the frequency components, two frequency components are selected: a frequency component X(f1) of a frequency f1=1,000 Hz at which voiced components may typically be most available, and a frequency component X(f3) of a frequency f3=3,000 Hz as a sub-component. The number of selected frequency components is herein set to two, which is surely not restrictive.

The frequency components X(fn) selected by the frequency selector 104 on the receiver side are outputted to the power calculator 106 on the receiver side. The power calculator 106 on the receiver side calculates power FPOW(fn, I) of one or more inputted frequency components.

Now, fn indicates the n-th frequency, and I indicates the I-th frame. For example, the power of a frequency component of 1,000 Hz in the first frame from the start of operation is indicated by FPOW(f1, 1).

A power value FPOW(fn, I) for every frame timing calculated by the power calculator 106 on the receiver side is outputted to the time difference calculator 96 shown in FIG. 6. The time difference calculator 96 calculates a long-term smoothing value LONG_FPOW(fn, I) of each power value FPOW(fn, I) as described by an expression (22):

$$LONG\_FPOW(fn,I) = \delta 30 \times LONG\_FPOW(fn,I-1) + (1.0 - \delta 30) \times FPOW(fn,I) \quad (22)$$

The initial value of LONG_FPOW(fn, I) is set to zero. δ30 is a constant indicating the degree of smoothing, and is in the range of 0<δ30<1.0. As δ30 increases, the degree of smoothing also increases. As δ30 decreases, a value of LONG_FPOW(fn, I) is closer to FPOW(fn, I) in itself to decrease the effect of the smoothing. In the instant alternative embodiment, the constant δ30 is set to 0.99. However, the present invention may not be restricted to this specific value.

Now, a condition 3a is that the previous frame satisfies RFD=0, and another condition 3b is that the current frame satisfies an expression (23):

$$FPOW(fn,I) \geq LONG\_FPOW(fn,I) + \delta 31 \quad (23)$$

When both conditions 3a and 3b are satisfied, the frame number I is set equal to the frame number of a positive-going edge R_ID(fn) of the n-th frequency component on the receiver side, and RFD is set to "1". In the expression, δ31 is a threshold value for determining a detection of a voiced frequency component. In the instant alternative embodiment, δ31 is set to 12 [dB]. However, the present invention may not be restricted to this specific value.

Once a voiced frequency component is detected to render RFD=1, the condition 3a will not be satisfied until LONG_FPOW(fn, I) increases up to a value close to FPOW(fn, I) during a voiced period. Therefore, RFD is a flag indicative of detecting "a moment of a steep positive-going edge of power at a given frequency."

In the instant alternative embodiment, the time difference calculator 96 is thus adapted to detect the frame number at a positive-going edge timing R_ID(fn) of frequency power. However, the way of detecting the positive-going edge timing of frequency power may not be restricted to this example, but may be implemented in any manner capable of detecting the positive-going edge of a voiced frequency component.

In the above, the detection of the positive-going edge of a frequency component at the receiver has been described. However, the time difference calculator 96 also similarly detects a positive-going edge of frequency power for the near-end input signal on the transmitter side. More specifically, the frequency converter 102 on the transmitter side frequency-converts the plurality (J) of signals y(n), where n=1, . . . , J, in the time domain to the plurality (J) of frequency components Y(fn) in the frequency domain for every J predetermined sample frames to output the converted frequency components Y(fn) to the frequency selector 104 on the transmitter side.

The frequency selector 104 on the transmitter side always selects the same frequency component as on the receiver side among the frequency components Y(fn). In the instant alternative embodiment, as described above, the components of the frequency f1 of 1,000 Hz and the frequency f3 of 3,000 Hz are selected.

The frequency components Y(fn) selected by the frequency selector 104 on the transmitter side are supplied to the power calculator 106 on the transmitter side. The power calculator 106 on the transmitter side calculates power FPOW_s(fn, I) and supplies the calculated power FPOW_s(fn, I) (114) to the time difference calculator 96.

The time difference calculator 96, for the power FPOW_s(fn, I) also, similarly to the power FPOW(fn, I) on the receiver side, finds the frame number of a positive-going edge S_ID(fn) of the n-th frequency component on the transmitter side.

Next, the time difference calculator 96 calculates, on the basis of R_ID(fn) and S_ID(fn) in each frequency component on the receiver and transmitter sides, a time difference fn_id in the positive-going edge time of the n-th frequency component by an expression (24):

$$fn\_id = S\_D(fn) - R\_ID(fn) \quad (24)$$

For example, the time difference f1_id in the positive-going edge time of the first frequency component can be calculated by an expression (24-1):

$$f1\_id = S\_D(f1) - R\_ID(f1) \quad (24\text{-}1)$$

Now, the time difference f1_id indicates how many frames there are at which the component of 1,000 Hz, after outputted from the receiver side, started to be leaked onto the transmitter side.

Similarly, the remaining selected frequency components are also processed by the expression (24). Thus, in the instant alternative embodiment, in addition to the frequency component f1, the frequency component f3 is also similarly processed by the expression (24).

Then, the time difference calculator 96 outputs the time difference fn_id for each selected frequency to the deviation determination circuit 98. The deviation determination circuit 98 calculates the maximum value MAX_DIF_fn_id among variations in the time differences fn_id of each frequency component.

Now, with the instant alternative embodiment, two frequency components are used to calculate the maximum variation value as described by an expression (25):

$$MAX\_DIF\_f1\_id(K) = MAX\{f2\_id - f1\_id\} \quad (25)$$

However, when selecting more frequencies, the expression (25) may be calculated corresponding to the number of selected frequencies. In the expression, a variable K indicates a result from the K-th maximum value calculation, where K is a natural number. Additionally, MAX( ) represents a function for calculating the maximum value.

When the function MAX_DIF_fn_id(K) satisfies the following expression (26), the deviation determination circuit 98 outputs the function MAX_DIF_fn_id(K) as a major candidate susup_id(K) for the initial delay estimation value to the initial delay determination circuit 100:

$$MAX\_DIF\_f1\_id(K) \leq \delta 32 \quad (26)$$

Otherwise, i.e. if the expression (26) is not satisfied, then the deviation determination circuit 98 outputs nothing to the initial delay determination circuit 100. In the expression, a threshold value δ32 defines an allowable variation in number of frames. In the instant alternative embodiment, the threshold value δ32 is set to "1". However, the present invention may not be restricted to this specific value.

Originally, the expression (24) relies upon a concept that it takes a constant period of time for an audio signal to propagate over the echo path regardless of its frequency in order to improve the accuracy or likelihood of a result of an estimation calculation for an initial delay. The period of time necessary for propagating over the echo path is a quantity uniquely defined physically by a distance between the loudspeaker 14 and the microphone 16 and a sound velocity.

On the other hand, the echo path of the near-end talker may involve various noise sources, which may interfere with the calculation for the initial delay of the echo path. For example, from a point of view of estimation calculation for the initial delay, even the voice signal of the near-end talker may act as noise interfering echo path estimation.

Generally, however, it very rarely occurs that an echo is one and the same audio signal as noise on the near-end talker side. Initial delay estimation of an echo path is therefore relied upon that fact. For example, during measuring the echo path, the near-end talker may talk, or some apparatus in his or her office may start to work to cause noise. Under that situation, if the initial delay estimation values on the echo path for the respective frequencies involve remarkably differences, such differences mean that the echo path initial delay was improperly estimated. In that case, the echo path initial delay estimation values would not be used.

In the present alternative embodiment, as described above, noise on the near-end talker side is prevented from disturbing the calculation for the initial delay estimation of the echo path.

The initial delay determination circuit 100 once holds or stores a plurality of predominant candidates susup_id(K) for the initial delay estimation value, and calculates the maximum value MAX_DIF_susup_id(K2) among variations in predominant candidates susup_id(K) for the initial delay estimation value by means of an expression (27):

$$\text{MAX\_DIF\_}susup\_id(K2) = \text{MAX}\{susup\_id(K2)\} \quad (27)$$

It is to be noted that, in the instant alternative embodiment, predominant candidate data are stored twice. However, the present invention may not be restricted to this specific value. In the expression, a variable K2 indicates a result of the K2-th maximum value calculation.

Then, when the function MAX_DIF_susup_id(K2) satisfies the following expression (28), the initial delay determination circuit 100 supplies MAX_DIF_susup_id(K2) as the tap starting point st (120) of the ADF 24 to the coefficient selector 22:

$$\text{MAX\_DIF\_}susup\_id(K2) \leq \delta 33, \quad (28)$$

where δ33 is a threshold value for defining an allowable variation in detection values. In the instant alternative embodiment, the threshold value δ33 is set to "1". However, the present invention may not be restricted to this specific value.

The initial delay determination circuit 100 converts the time difference fn_id of the expression (24) representing the smallest time difference, namely, a difference in the numbers of frames to a difference in the samples as described by an expression (29)

$$st = J \times (\text{MIN}\{fn\_id\} - \delta 34) \quad (29)$$

to output a tap coefficient starting point st to the coefficient selector 22.

In the expression, δ34 indicates the number of margin frames, and J indicates the number of samples of the frame. In the current alternative embodiment, the number of margin frames δ34 is set to "0" as a margin. However, for example, in a case of longer frames or under a known condition where the audio signal includes much noise, the number of margin frames δ34 may be set to an appropriate value for margin frames.

The variation calculation the initial delay determination circuit 100 performs on plural candidates by means of the expression (28) intends to improve the likelihood of an echo path initial delay estimation value. The expression (26) is defined to check the congruence of the delay estimation amounts for each frequency. By contrast, the expression (28) is defined to check the congruence of results from several calculations for different periods, thereby further improving the likelihood of the calculated result of the echo path initial delay estimation.

When calculation by the expression (29) fails to find the tap coefficient starting point st, the initial delay determination circuit 100 outputs the tap coefficient starting point st=0 to the coefficient selector 22, and, once the tap coefficient starting point st is calculated by the expression (29), it delivers this calculated value 120 to the coefficient selector 22.

The coefficient selector 22 operates, as with the alternative embodiment shown in and described with reference to FIG. 4, by setting the tap coefficient starting point st as a tap coefficient starting sample point, and will thereafter operate similarly to that alternative embodiment.

Additionally, when the initial delay estimation circuit 90 receives the deterioration detection signal or a reset signal span_reset (86) from the ACANC calculator 28, it resets itself to its initial state, and will operate from the beginning as described above.

The instant alternative embodiment thus enjoys, in addition to the advantageous effects of the other embodiments, the advantage that it can follow a change in echo path initial delay in itself rather than a positional change of the near-end talker.

Additionally, in accordance with the instant alternative embodiment, an echo canceller may be provided which can efficiently set the coefficient taps of a filter even in an apparatus having the echo canceller 10 installed with a distance between the loudspeaker 14 and the microphone 16 often changeable, such as an apparatus to which the loudspeaker 14 and the microphone 16 are connected by a connecting cable, thus being capable of retrenching superfluous operational energy and quickening response operation without deteriorating its performance for suppressing echo.

Figure 8:
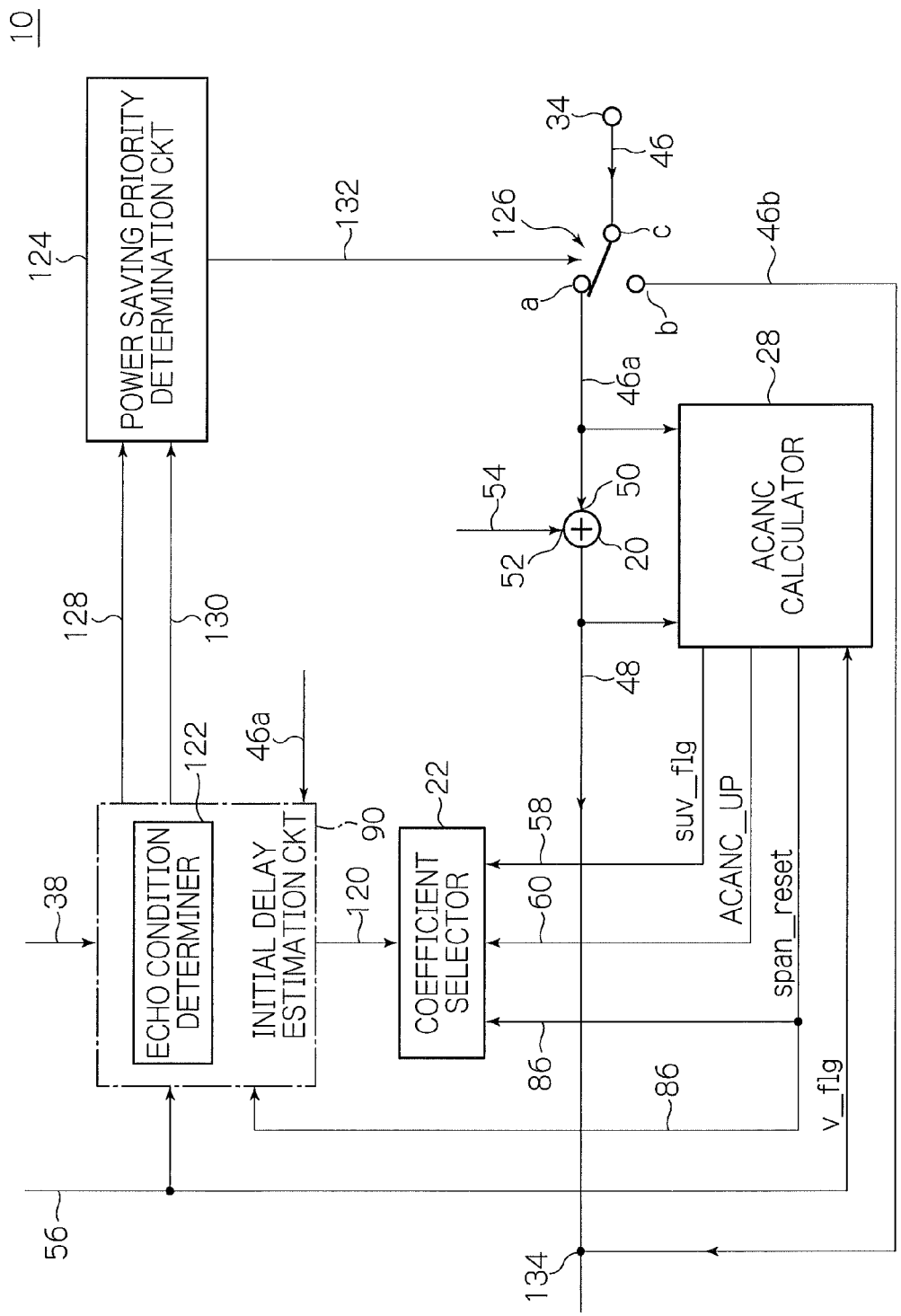
FIG. 8 is a schematic block diagram showing a substantial configuration of another alternative embodiment of an echo canceller to which the present invention is applied.

Well, a further alternative embodiment of the echo canceller 10 will be described in accordance with the present invention. The echo canceller 10 in this alternative embodiment maybe the same, as shown in FIG. 8, as the alternative embodiment shown in and described with reference to FIG. 6 except for the initial delay estimation circuit 90 including an echo condition determiner 122 and the echo canceller 10 including a power saving priority determination circuit 124 and a switch 126, as will be described below.

The power saving priority determination circuit 124 has a function to be operative in response to receiving at least one of echo canceller stop signals 128 and 130 from the echo condition determiner 122 to generate a switch signal for switching the switch 126. The power saving priority determination circuit 124 is connected between the initial delay estimation circuit 90 and the switch 126. The power saving priority determination circuit 124 outputs the generated switch signal 132 to the switch 126.

The switch 126 is connected between the transmitter input terminal Sin (34) and the cancellation adder 20. The switch 126 has its common terminal c fed with the digital audio signal y(n) (46) through the transmitter input terminal Sin (34) on the transmitter side. The switch 126 has two output terminals a and b. The output terminal a is connected to the terminal 50 of the cancellation adder 20. The output terminal b bypasses, in order to avoid echo cancelling on the digital audio signal, the circuit to be connected to a connection terminal 134 on the output side of the cancellation adder 20. In the present alternative embodiment, in order to distinguish the digital audio signals through the output terminals a and b from each other, these digital audio signals are indicated by 46a and 46b, respectively. The switch 126 is connected in its initial state to the output terminal a, and is switched to the output terminal b in response to the switch signal 132. Whenever prioritizing power saving, the switch 126 will be switched to the output terminal b.

Figure 9:
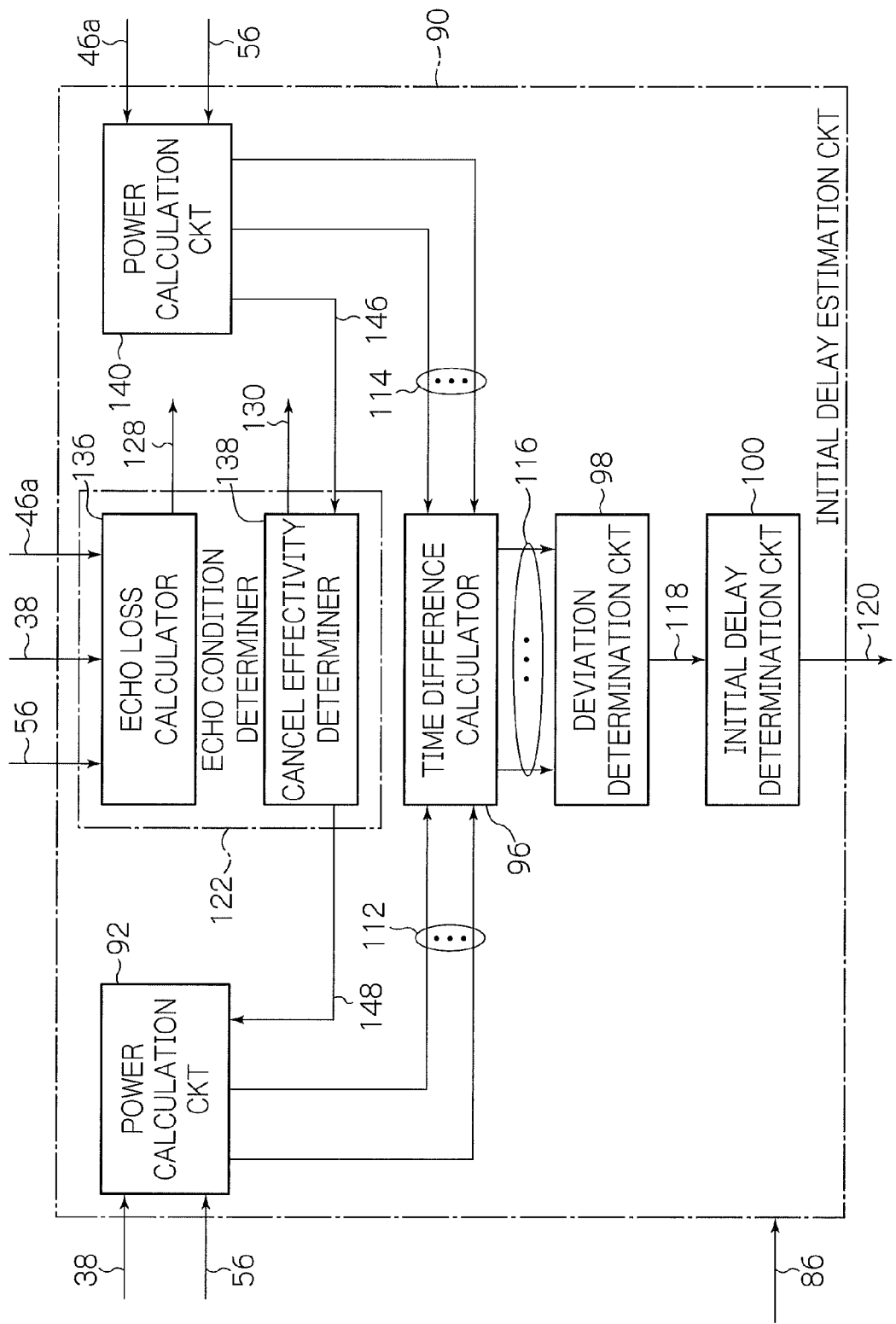
FIG. 9 is a schematic block diagram showing the configuration of an initial delay estimation circuit shown in FIG. 8.

The initial delay estimation circuit 90 is adapted for estimating the initial delay amount as with the illustrative embodiments, and further includes the echo condition determiner 122, the latter being shown in FIG. 9 in more detail. The echo condition determiner 122 includes an echo loss calculator 136 and a cancel effectivity determiner 138. The echo loss, calculator 136 has a function to calculate an echo loss as a signal attenuation amount of the echo path, and to compare the calculated echo loss with a predetermined loss threshold value. When the calculated echo loss is determined larger than the predetermined loss threshold value, the calculator 136 produces the echo canceller stop signal 128 to the power saving priority determination circuit 124.

The echo loss calculator 136 is responsive to the flag v_flg=1 (56) indicating "voiced" from the VAD 26 as well as the far-end input signal x(n) (38) and the transmitter input signal y(n) (46a) to calculate the echo loss of the echo path on the basis of the magnitudes of the far-end input signal x(n) and the transmitter input signal y(n). When the calculated echo loss is determined larger than the predetermined loss threshold value, the calculator 136 produces the echo canceller stop signal 128 to the power saving priority determination circuit 124.

The cancel effectivity determiner 138 is adapted to determine, in calculation, whether to stop the echo canceller 10 from its cancel operation in dependent upon the number of selected frequencies supplied from the power calculation circuit 140 on the transmitter side, and to compare the calculated value with a predetermined stop threshold value to thereby determine whether or not the calculated value is larger than the predetermined stop threshold value to produce an echo canceller stop signal. When near-end noise, even after the echo canceller 10 is enabled, is too strong to be distinguishable from the echo, the cancel effectivity determiner 138 outputs the echo canceller stop signal 130 for stopping, or disabling, the echo canceller 10 from operation to the power saving priority determination circuit 124.

Specifically, the cancel effectivity determiner 138 calculates, when receiving the flag v_flg=1 indicating "voiced" from the VAD 26 and the transmitter input signal y(n) (46a), a ratio of, or a difference between, magnitudes of the echo component and background noise during a period of voice activity detection by the VAD 26. If the calculated value exceeds the predetermined stop threshold value, then the determiner 138 produces the echo canceller stop signal 130 to the power saving priority determination circuit 124.

Figure 10:
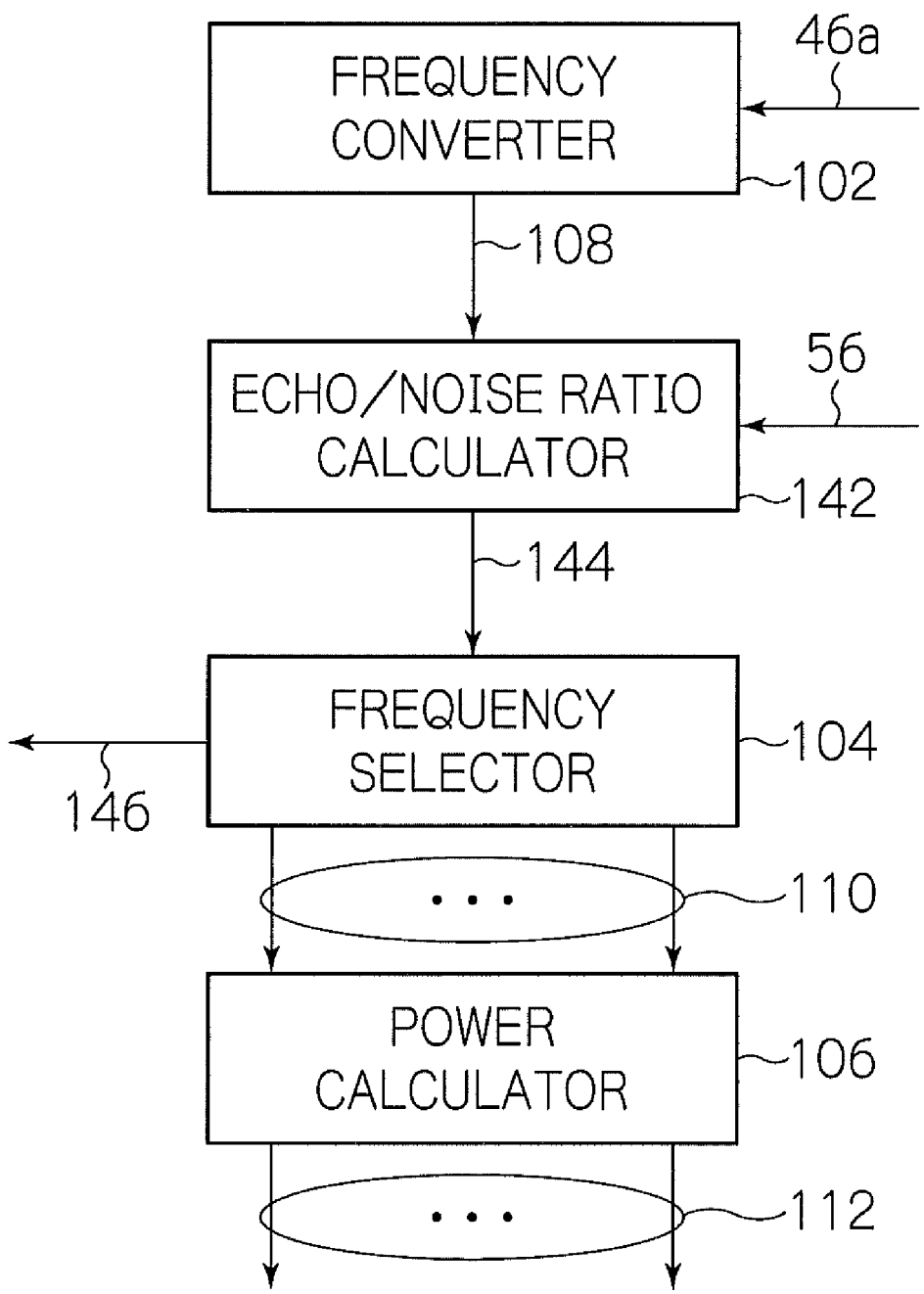
FIG. 10 is a schematic block diagram showing the configuration of a power calculation circuit on the transmitter side shown in FIG. 9.

The power calculation circuit 140 in the initial delay estimation circuit 90 shown in FIG. 9 may be the same as the power calculation circuit 94 of the preceding alternative embodiments except for some components and elements being different. The power calculation circuit 140 additionally includes, as shown in FIG. 10, an echo/noise ratio calculator 142 connected between the frequency converter 102 and the frequency selector 104. The illustrative embodiment may not be restricted to inclusion of the echo/noise ratio calculator 142, but alternatively include an echo/noise difference calculator as described earlier.

The frequency converter 102 frequency-converts the digital audio signal on the transmitter side, i.e. the echo component y(n) (46a). The frequency converter 102 may be the same as the frequency converter 102 shown in FIG. 7 except for the lack of input of the voice activity detection signal v_flg (56) from the VAD 26.

The echo/noise ratio calculator 142 has a function to calculate the ratio of magnitudes of the echo component and the noise, and to compare the calculated echo-to-noise ratio with a predetermined ratio threshold value. Whenever the calculated echo-to-noise ratio is determined as exceeding the ratio threshold value, the calculator 142 outputs a signal representative of the echo/noise ratio. The echo/noise ratio calculator 142 receives the voice activity detection signal v_flg (56) from the VAD 26, and uses that detection signal v_flg (56) to set the magnitude of the near-end input signal received when the flag v_flg=0 to the magnitude of the noise while the magnitude of the near-end input signal received when the flag v_flg=1 to the magnitude of the echo component. The echo/noise ratio calculator 142 calculates the ratio of magnitudes of the echo component and the noise, and compares the calculated echo-to-noise ratio with the predetermined ratio threshold value. When the calculator 142 determines the calculated echo-to-noise ratio exceeding the ratio threshold value, it outputs a signal representing the echo-to-noise ratio 144 to the frequency selector 104.

When the frequency selector 104 receives the echo-to-noise ratio exceeding the predetermined ratio threshold value, it selects a predetermined number of echo components in the descending order from the echo component of the largest magnitude to output the selected frequencies to the cancel effectivity determiner 138. Additionally, the frequency selector 104 selects, as with the preceding embodiments, a frequency component selected by the frequency selector 104 among the frequency components from the frequency converter 102 to output the selected frequency component to the power calculator 106.

Next, the operation of the echo canceller 10 in accordance with the instant alternative embodiment will be described in detail with reference to FIGS. 8, 9, and 10 with a focus placed on the operation different from the preceding alternative embodiments. It will, however, be described as necessary how some components, like the VAD 26, develop output signals which will be ramified to an input to the additional components although the internal operation may be the same in the instant embodiment.

In the echo canceller 10 shown in FIG. 8, the switch 126 is connected to its output terminal a in the initial state so as to cancel the supplied echo component 46.

The far-end input signal x(n) (38) is inputted to the initial delay estimation circuit 90. The initial delay estimation circuit 90 also receives the flag v_flg (56) from the VAD 26, the deterioration detection signal span_reset (86) from the ACANC calculator 28, and the input signal y(n) (46a) from the transmitter input terminal Sin (34).

Further with reference to FIG. 9, the operation of the initial delay estimation circuit 90 will be described. The far-end input signal x(n) (38) from the far-end is inputted to the power calculation circuit 92 on the receiver side and to the echo loss calculator 136. The power calculation circuit 92 on the receiver side is the same as in FIG. 7.

The echo loss calculator 136 is fed with, in addition to the far-end input signal x(n) (38), the echo component y(n) (46a) from the transmitter input terminal Sin (34) and the flag v_flg (56) from the VAD 26. The echo loss calculator 136 will process a transition to a power saving operation, as described below.

When the echo loss calculator 136 receives the flag v_flg=1 (56) from the VAD 26, it calculates a temporally averaged power value x_avel(n) of the far-end input signal x(n) (38) and a temporally averaged power value y_avel(n) of the echo component y(n) (46*a*), respectively, by expressions (30) and (31):

$$x\_avel(n) = \delta 40 \times x^2(n) + (1.0 - \delta 40) \times x\_avel(n) \quad (30)$$

$$y\_avel(n) = \delta 40 \times y^2(n) + (1.0 - \delta 40) \times y\_avel(n) \quad (31)$$

In the expressions, δ40 is a constant satisfying a condition of 0<δ40<1.0. Additionally, δ40 is a smoothing constant for controlling an average length of signals. When the constant δ40 is larger, the sensitivity to noise readily increases, but a response to a change invoicedpower is improved. When the constant δ40 is smaller, the sensitivity to noise readily decreases, but a response to a change in voiced power is slower. In the instant alternative embodiment, the echo loss is preferably calculated on an element of a relatively slow signal to therefore set δ40 to 0.001. However, the illustrative embodiment may not be restricted to this specific value. Additionally, the expressions (30) and (31) in the instant alternative embodiment are defined to calculate average values of power, but may instead be defined to calculate absolute values of the signals.

Next, the echo loss calculator 136 calculates an echo loss amount AECHO(n) by an expression (32):

$$AECHO(n) = 10 \log_{10}(x\_avel(n)/y\_avel(n)) \; (dB) \quad (32)$$

Then, the echo loss calculator 136 compares the calculated echo loss amount AECHO(n) with a predetermined loss threshold value δ41. If the following expression (33) is satisfied, then the calculator 136 produces the echo canceller stop signal P_SAVE=1 (128) to the power saving priority determination circuit 124:

$$AECHO(n) \geq \delta 41 \quad (33)$$

In the instant alternative embodiment, the loss threshold value δ41 is set to 40 [dB]. However, the illustrative embodiment may not be restricted to this specific value. This is based on considering the circumstances as described below.

For example, with telephone systems, the signal level on transmission lines may usually be adjusted to a level of about −20 dBm that is an audio level regulated by ITU-T (International Telecommunication Union-Telecommunication Standardization Sector) G.711. In such a case, when an echo path maintains the echo loss of no fewer than 40 dB, a far-end listener would not receive such an echo that may interfere with his or her telephonic conversation. Rather, even if the echo canceller were rendered operative in such a case, this would often cause the higher possibility in erroneously determining the near-end talker signal to be echo to cancel this signal. Therefore, in such a case, the echo canceller 10 is adapted to rather prioritize the saving of power consumption, and cease the echo canceller from operation.

The power saving priority determination circuit 124 is supplied also with the echo canceller stop signal P_SAVE (130) from the cancel effectivity determiner 138 described below. When the power saving priority determination circuit 124 receives the echo canceller stop signal P_SAVE=1 from either the echo loss calculator 136 or the cancel effectivity determiner 138, it supplies the switch signal 132 to the switch 126 to thereby turn the switch 126 from the output terminal a side to the terminal b side, and resets, or initialize, its whole internal state, not shown, of the echo canceller to stop the echo canceller from operation.

The far-end input signal x(n) (38) is converted from the time domain to the frequency domain by the frequency converter 102 in the power calculation circuit 92 on the receiver side, and then inputted to the frequency selector 104 on the receiver side.

The frequency selector 104 on the receiver side may be the same as the preceding alternative embodiment except for not being adapted to select a frequency component by itself but receive frequency selection information 146, described below, outputted from the frequency selector 104 on the transmitter side as frequency selection information 148 to comply with this information.

Next, operation up to the frequency selector 104 in the power calculation circuit 140 on the transmitter side will be described in sequence. The transmitter input signal y(n) (46*a*), as shown in FIG. 10, is inputted to the frequency converter 102 on the transmitter side.

The frequency converter 102 on the transmitter side is operative differently from the frequency converter 102 on the transmitter side of the preceding alternative embodiment. Thus, the converter 102 converts, regardless of the flag from the VAD 26, i.e. the voice activity detection signal v_flg (56), the echo component y(n) (46*a*) in the time domain to the signal Y(fn) in the frequency domain to output the signal Y(fn) to the echo/noise ratio calculator 142.

In the instant alternative embodiment, the FFT based on eight samples is used for the frequency converter 102 so that eight frequency components 108 are fed to the echo/noise ratio calculator 142. However, in accordance with the present invention, the number of frequency components for use in the frequency converter 102 may not be restricted to eight.

The echo/noise ratio calculator 142 receives the frequency components 108 converted by the frequency converter 102 on the transmitter side, and calculates the ratio of noise levels, that is, the ratio of a background noise level and an echo level, as described below.

Additionally, the echo/noise ratio calculator 142 receives the flag v_flg (56) from the VAD 26, and constantly calculates the magnitude |Y(fn)| of the signal Y(fn) in the frequency domain.

Now, the flag v_flg (56) is used as described below. The magnitude |Y(fn)|v_flg0 of the frequency component calculated at the timing of no sound signal input, i.e. of the flag v_flg=0, is set as the latest noise level. Further, the magnitude |Y(fn)|v_flg1 of the frequency component calculated at the timing of inputting a sound signal, i.e. of the flag v_flg=1, is set as the latest echo component level. Note that the echo/noise ratio calculator 142 thus uses the flag v_flg to calculate the magnitude of the echo frequency component because of the calculator 142 utilizing the presence or absence of an echo source signal.

In the present alternative embodiment, furthermore, due to influence of the initial delay by echo, respectively predetermined numbers of, e.g. ten, magnitudes |Y(fn)|v_flg0 and |Y(fn)|v_flg1 are collected to find average values thereof by expressions (34) and (35):

$$AVL\_|Y(fn)|v\_flg0 \quad (34)$$

$$AVL\_|Y(fn)|v\_flg1 \quad (35)$$

In this alternative embodiment, the number of sampling is set to ten. However, the illustrative embodiment may not be restricted to this value. Alternatively, a smoothing method as described in connection with the averaging method for signals in the time domain may be applied.

Then, the echo/noise ratio calculator 142 calculates a ratio R_EN(fn) of magnitudes of the echo and the noise by an expression (36):

$$R\_EN(fn) = 20 \log_{10}(AVL\_|Y(fn)|v\_flg0/AVL\_|Y(fn)|v\_flg1), \quad (36)$$

where a variable n is in the range of n=1, . . . , J. In the instant embodiment, J is set to 8.

Then, the echo/noise ratio calculator 142 outputs the J values Y(fn) of the frequency components inputted from the frequency converter 102 on the transmitter side and the J echo/noise ratios R_EN(fn) calculated by the expression (36) as an output signal 144 to the frequency selector 104 on the transmitter side.

The frequency selector 104 on the transmitter side first selects a frequency satisfying an expression (37) as Ysusup (fn):

$$R\_EN(fn) \geq \delta 42 \quad (37)$$

where a threshold value δ42 is set to 3 dB. Of course, the present invention may not be restricted to this specific value.

Then, the frequency selector 104 on the transmitter side selects a predetermined number I of echo components in the descending order from the echo component of the largest value of |Y(fn)|v_flg1 among Ysusup(fn), and outputs the I number of selected values and the selected frequencies fn as output information 146 to the cancel effectivity determiner 138. In the instant alternative embodiment, I is set to 2.

If the frequencies in Ysusup(fn) are fewer than the predetermined number I, then the frequency selector 104 on the transmitter side provides the cancel effectivity determiner 138 with only such frequency components satisfying the expression (37) and the number I set to the number of such selected values.

The cancel effectivity determiner 138 outputs, when the number of inputs I from the frequency selector 104 on the transmitter side satisfies I>0, the number I of selected values and the selected frequencies fn as output information 148 to the frequency selector 104 on the receiver side.

The frequency selector 104 on the receiver side operates with the number I of frequency components fn inputted from the cancel effectivity determiner 138 taken as frequency components selected by itself.

Otherwise, where the number of inputs I from the frequency selector 104 on the transmitter side satisfies I=0, as described below, the cancel effectivity determiner 138 will operate in the following manner.

The number of inputs I=0 represents that the echo component y(n) is smaller than the noise, in other words, the echo cannot be observed since buried in the noise, over all the frequency components. As with the illustrative embodiment shown in and described with reference to FIG. 1, the ADF 24 cannot effectively update the tap coefficients in the case of echo buried in noise. Therefore, in such a case, it would not be significant but ineffectual in practice to render the ADF 24 operative.

Therefore, the cancel effectivity determiner 138, FIG. 9, is adapted to output, in the case of the number of inputs I=0, the echo canceller stop signal P_SAVE=1 (130) to the power saving priority determination circuit 124.

When the power saving priority determination circuit 124, FIG. 8, receives the echo canceller stop signal P_SAVE=1 (128, 130) from at least one of the echo loss calculator 136 or the cancel effectivity determiner 138, it outputs the switch signal 132 to the switch 126 so as to turn the switch 126 to the output terminal b side. In turn, the switch 126 turns its connection from the output terminal a to the output terminal b to pass the echo component 46 as the echo component 46b, and the whole internal state of the echo canceller 10 will be reset to stop itself from operation.

The initial delay estimation circuit 90 may select, for estimation of the initial delay, a predetermined number of frequency components in the descending order from the frequency component having the highest echo power among the frequency components associated with the ratio or difference found by the echo/noise ratio calculator 142 exceeding the threshold value.

In summary, the instant alternative embodiment additionally includes the power saving priority determination circuit 124 and the switch 126. The echo loss calculator 136 of the echo condition determiner 122 is provided in the initial delay estimation circuit 90 to calculate the echo loss to detect that the echo is sufficiently small without an echo canceller. The echo/noise ratio calculator 142 detects the signal power ratio of near-end noise and echo. The cancel effectivity determiner 138 detects an environment in which near-end noise too large even for an echo canceller, when enabled, to distinguish noise from echo. At least one of the echo loss calculator 136 and the cancel effectivity determiner 138 causes the power saving priority determination circuit 124 to output the echo canceller stop signal P_SAVE (132) for stopping and resetting the echo canceller 10 and for switching the circuit 126 to pass a signal to be transmitted. Thus, the echo canceller can be provided which is advantageously applicable to the cases where echo is sufficiently small to be harmless in practice even without activating the echo canceller 10 and effective echo suppression is not expected such as to improve sound quality due to echo being comparable in level to noise, without wastefully operating. the echo canceller and changing influence of echo during telephonic conversation, thus saving power consumption.

In general, in order to control the ADF 24 to update its coefficients and stop itself, a bidirectional speech detector, not shown, may be used. The bidirectional speech detector known is adapted to stop the ADF from its adaptive operation in a so-called double-talk state in which a signal received from a far-end talker exists concurrently with a signal to be transmitted from a near-end talker. The bidirectional speech detector is also adapted to stop itself from both updating the coefficients and generating pseudo echo in a transmission state where a near-end talker signal solely exists and a silent state where neither far-end nor near-end talker signals are transmitted. The four illustrative embodiments described above may include such a known bidirectional speech detector in order to accomplish such control as described.

In the alterative embodiment described last, the echo/noise ratio calculator 142 sets the magnitude |Y(fn)|v_flg0 of the frequency component calculated at the timing of the flag v_flg=0 from the VAD 26 as the noise level. However, instead of using the voice activity detection flag v_flg, the magnitude of the smallest frequency component among the frequency components calculated by the frequency converter 102 on the transmitter side may be used as the noise level.

This relies on the nature that human voice has harmonics in spectrum structure so that portions of which the actual frequency components are locally smaller are dotted. The setting described above removes the necessity of collaboration with the VAD 26 in the voice activity detection flag and the power calculation, thus simplifying the configuration and/or operation of the system, downsizing the software and hardware, and further saving power consumption.

Furthermore, in the embodiment described last with reference to FIG. 8, a sampling frequency is set to 8 kHz. However, if the sampling frequency is higher, for example, equal to or higher than 161 kHz, the system may be adapted, in addition to stopping the collaboration with the VAD 26, for using, for example, the magnitude of a predetermined component among the higher frequency components as the noise level. The predetermined component may be a component of, for example, 7 kHz.

This is based on a known fact that the higher frequency of human voice generally tends to decrease in frequency spectrum. Particularly, when applying this manner to a voice having its frequency component fewer than in higher frequency, such as Japanese pronunciation, the mechanism for selecting a frequency can be more simplified. This can further downsize hardware and software, and can save operational energy for the apparatus.

The entire disclosure of Japanese patent application No. 2009-208337 filed on Sep. 9, 2009, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. An echo canceller including an adaptive filter (ADF) for utilizing a far-end input signal to generate a pseudo-echo signal, and an echo suppression circuit for using the pseudo-echo signal to suppress an echo component included in a near-end input signal, comprising:

an ACANC (Amounts of echo CANCellation) calculator operative in response to the near-end input signal inputted to said echo suppression circuit and an output signal outputted from said echo suppression circuit for finding an average value of an amount of echo cancellation for a predetermined period to update the average value of the amount of echo cancellation accordingly, and detecting a convergence state of said adaptive filter to find the amount of echo cancellation for a convergence period in the convergence state of said adaptive filter; and a coefficient selector operative in response to a detection signal of the convergence state of said adaptive filter being received from said ACANC calculator for finding a power ratio of a sum total of power of all tap coefficients held by said adaptive filter and a partial total of power of tap coefficients not to be assigned to taps among the tap coefficients of said adaptive filter, and determining an effective number of taps useful for suppressing an echo component on a basis of the amount of echo cancellation for the convergence period and the power ratio, said adaptive filter updating the effective number of taps determined by said coefficient selector.

2. The echo canceller in accordance with claim 1, wherein the partial total of the power is a total of the tap coefficients corresponding to a part temporally backward from the effective number of taps among the tap coefficients of said adaptive filter.

3. The echo canceller in accordance with claim 1, wherein, in order to find a holding point of a conditional expression $$\text{POW\_LOG}(m) = 10\log_{10}\left\{\frac{\sum_{i=0}^{N-1} h_i^2(t)}{\sum_{i=M}^{N-1} h_i^2(t)}\right\} + \delta_{ACANC} \geq ACANC,$$

where N is the number of all of taps of said adaptive filter, m is a tap position representing the number of taps, POW_LOG(m) is a power log including the power ratio with the number of taps m set, h is a tap coefficient of said adaptive filter, and $\delta_{ACANC}$ is a margin threshold value set, M is an integer in a range of $0 \leq M \leq N-1$ indicating the effective number of taps and ACANC is an amount of the echo cancellation, said coefficient selector sequentially substitutes these values into the conditional expression with m=M set, and finds the effective number of taps on the basis of the amount of echo cancellation for the convergence period and the power ratio.

4. The echo canceller in accordance with claim 3, wherein said coefficient selector gives a tap starting point obtained by a predetermined manner and a tap ending point of said adaptive filter as the number of taps m found by the conditional expression to said adaptive filter to thereby determine the effective number of taps.

5. The echo canceller in accordance with claim 1, further comprising a voice activitydetector (VAD) for detecting whether or not a voice signal is inputted on a receiver path, said ACANC calculator finding, when said video activity detector detects a voice activity, the average value of the amount of echo cancellation.

6. The echo canceller in accordance with claim 1, wherein said ACANC calculator continues to update, after said coefficient selector determines the effective number of taps, the average value of the amount of echo cancellation, and is responsive to detection of deterioration of the amount of echo cancellation to supply said coefficient selector with an echo cancellation performance deterioration signal, said coefficient selector being responsive to the echo cancellation performance deterioration signal to return said adaptive filter to an initial state.

7. The echo canceller in accordance with claim 6, wherein said ACANC calculator uses a relationship in magnitude between a value obtained by leaking a predetermined amount of an average maximum value of the amount of echo cancellation and a value holding the average maximum value of the amount of echo cancellation to thereby detect the deterioration of the amount of echo cancellation.

8. The echo canceller in accordance with claim 7, wherein said ACANC calculator detects, when a short-term maximum value of the amount of echo cancellation decreases from a value obtained by subtracting a predetermined value from a long-term maximum value of the amount of echo cancellation, the deterioration of the amount of echo cancellation.

9. The echo canceller in accordance with claim 6, wherein said coefficient selector provides said adaptive filter with zero as the tap starting point and the number of all of taps of said adaptive filter as the tap ending point to.

10. The echo canceller in accordance with claim 1, further comprising an initial delay estimation circuit for estimating an initial delay of an echo path on the basis of the far-end input signal and the near-end input signal.

11. The echo canceller in accordance with claim 10, wherein said initial delay estimation circuit comprises:

a first power calculation circuit for converting the far-end input signal to a frequency component, selecting one or more frequency components among the converted frequency components, and calculating power of the selected frequency components;

a second power calculation circuit for converting the echo component to a frequency component, selecting one or more frequency components among the converted frequency components, and calculating power of the selected frequency components;

a time difference calculator for calculating a time difference in positive-going edges of power of each frequency between the far-end input signal found by said first power calculation circuit and the echo component found by said second power calculation circuit;

a deviation determination circuit for finding a maximum value for each frequency component among variations in the calculated positive-going edge time differences of each frequency component, and determining whether or not the found maximum value of the positive-going edge time difference for each frequency component is equal to or less than a threshold value; and an initial delay determination circuit for holding a plurality of initial delay estimation values for each frequency for each period, determining, when the initial delay estimation values are in a predetermined range in advance, a final initial delay amount of the echo path from the initial delay estimation values, and determining the tap starting point of said adaptive filter.

12. The echo canceller in accordance with claim 11, wherein said first power calculation circuit comprises:

a first frequency converter for converting the far-end input signal to a frequency component;

a first frequency selector for selecting one or more frequency components among the converted frequency components; and a first power calculator for calculating power of the selected frequency components;

said second power calculation circuit comprising:

a second frequency converter for converting the echo component to a frequency component;

a second frequency selector for selecting one or more frequency components among the converted frequency components; and a second power calculator for calculating power of the selected frequency components.

13. The echo canceller in accordance with claim 11, wherein said deviation determination circuit determines whether or not the positive-going edge time difference for each frequency component is in a predetermined range, and sets, when the positive-going edge time difference is equal to or less than the threshold value, a minimum time difference among the time differences for each frequency to an initial delay estimation value of the echo path.

14. The echo canceller in accordance with claim 11, wherein said initial delay estimation circuit comprises an echo condition determiner for determining an echo condition on the basis of the far-end input signal and the near-end input signal during a period of the detection of voice activity by said video activity detector, and generating a stop signal for stopping operation of said echo canceller in response to the determination, said echo canceller further comprising:

a power saving priority determination circuit operative in response to the stop signal for determining whether to prioritize power saving, and producing a switch signal when determining the power saving to be prioritized; and a switch operative in response to the switch signal supplied for switching the supplied near-end input signal to a destination accordingly to thereby enable or disable echo cancellation.

15. The echo canceller in accordance with claim 14, wherein said echo condition determiner comprises:

an echo loss calculator for finding an attenuation amount of sound through the echo path on the basis of a magnitude of the far-end input signal and a magnitude of the near-end input signal during the period of the detection of voice activity by said video activity detector, and comparing the attenuation amount with a predetermined loss threshold value to produce a stop signal for stopping the operation of said echo canceller; and an effectivity determination circuit for determining whether to enable the operation of said echo canceller to produce a stop signal for stopping the operation of said echo canceller, said first power calculation circuit comprising:

a first frequency converter for converting the far-end input signal to a frequency component;

a first frequency selector for selecting one or more frequency components among the converted frequency components; and a first power calculator for calculating power of the selected frequency components, said second power calculation circuit comprising:

a second frequency converter for converting the echo component to a frequency component;

an echo/noise ratio calculator for using a result of detection of the voice activity by said video activity detector to find, from a magnitude of an echo component included in the near-end input signal and a magnitude of noise included in the near-end input signal, a ratio or a difference in the magnitudes between the echo component and the noise, and comparing the found ratio or difference with the loss threshold value for each of a plurality of frequency components, said echo/noise ratio calculator outputting the found ratio or difference when the found ratio or difference exceeds the loss threshold value;

a second frequency selector for selecting one or more frequency components among the converted frequency components; and a second power calculator for calculating power of the selected frequency components.

16. The echo canceller in accordance with claim 15, wherein said effectivity determination circuit receives a result of the determination by said effectivity determination circuit to produce the stop signal when the number of the plurality of frequency components exceeding a predetermined threshold value is equal to or less than a predetermined number-of-component threshold value.

17. The echo canceller in accordance with claim 16, wherein said initial delay estimation circuit selects for estimation of the initial delay a predetermined number of frequency components in a descending order from the echo component having a highest echo power among the frequency components corresponding to the ratio or the difference found by said echo/noise ratio calculator exceeding a threshold value.

18. An echo canceller including an adaptive filter (ADF) for utilizing a far-end input signal to generate a pseudo-echo signal, and an echo suppression circuit for using the pseudo-echo signal to suppress an echo component included in a near-end input signal, comprising:
- an ACANC (Amounts of echo CANCellation) calculator operative in response to the near-end input signal inputted to said echo suppression circuit and an output signal outputted from said echo suppression circuit for finding an average value of an amount of echo cancellation for a predetermined period to update the average value of the amount of echo cancellation accordingly, and detecting a convergence state of said adaptive filter to find the amount of echo cancellation for a convergence period in the convergence state of said adaptive filter;
- a coefficient selector operative in response to a detection signal of the convergence state of said adaptive filter being received from said ACANC calculator for finding a power ratio of a sum total of power of all tap coefficients held by said adaptive filter and a partial total of power of tap coefficients not to be assigned to taps among the tap coefficients of said adaptive filter, and determining an effective number of taps useful for suppressing an echo component on a basis of the amount of echo cancellation for the convergence period and the power ratio;
- a voice activity detector (VAD) for detecting whether or not a voice signal is inputted on a receiver path;
- an echo loss calculator for finding an attenuation amount of sound over the echo path on the basis of a magnitude of the far-end input signal and a magnitude of the near-end input signal during the period of the detection of voice activity by said video activity detector, and comparing the attenuation amount with a predetermined loss threshold value to produce a stop signal for stopping operation of said echo canceller;
- an echo/noise ratio calculator for using a result of detection of the voice activity by said video activity detector to find, from a magnitude of an echo component included in the near-end input signal and a magnitude of noise included in the near-end input signal, a ratio or a difference in the magnitude between the echo component and the noise, and comparing the found ratio or difference with a threshold value;
- an effectivity determination circuit for determining whether to enable the operation of said echo canceller on the basis of a comparison result from said echo/noise ratio calculator; and
- a power saving priority determination circuit responsive to the attenuation amount found by said echo loss calculator exceeding a threshold value and said effectivity determination circuit determining the operation of said echo canceller to stop for stopping the operation of said echo canceller and passing the near-end input signal.

19. The echo canceller in accordance with claim 18, wherein said echo/noise ratio calculator compares a magnitude of the ratio or the difference in power between the echo component and the noise included in the near-end input signal with a magnitude of a threshold value for a plurality of frequency components.

20. The echo canceller in accordance with claim 18, wherein said effectivity determination circuit receives a result of the determination by said effectivity determination circuit to produce the stop signal when the number of the plurality of frequency components exceeding a predetermined threshold value is equal to or less than a predetermined number-of-component threshold value.

* * * * *